United States Patent [19]
Shinohara et al.

[11] Patent Number: 5,832,183
[45] Date of Patent: Nov. 3, 1998

[54] INFORMATION RECOGNITION SYSTEM AND CONTROL SYSTEM USING SAME

[75] Inventors: Wataro Shinohara, Kawasaki; Yasuo Takagi, Chigasaki; Yutaka Iino, Kawasaki; Shinji Hayashi, Yokohama; Junko Ohya; Yuichi Chida, both of Kawasaki; Masahiko Murai, Ichikawa, all of Japan

[73] Assignee: Kabushiki Kaisha Toshiba, Kawasaki, Japan

[21] Appl. No.: 782,289

[22] Filed: Jan. 13, 1997

Related U.S. Application Data

[62] Division of Ser. No. 208,584, Mar. 11, 1994, Pat. No. 5,619,619.

[30] Foreign Application Priority Data

| Mar. 11, 1993 | [JP] | Japan | 5-50791 |
| Mar. 11, 1993 | [JP] | Japan | 5-50880 |
| Mar. 11, 1993 | [JP] | Japan | 5-51066 |

[51] Int. Cl.$^6$ .................................................. G06F 15/18
[52] U.S. Cl. .................. 395/22; 706/16; 706/20; 706/26; 706/31
[58] Field of Search .................................. 395/24, 22

[56] References Cited

U.S. PATENT DOCUMENTS

| 4,802,103 | 1/1989 | Faggin et al. | 395/24 |
| 4,874,963 | 10/1989 | Alspector | 395/24 |
| 4,875,183 | 10/1989 | Graft et al. | 395/24 |
| 4,965,725 | 10/1990 | Rutenberg | 382/15 |
| 4,974,169 | 11/1990 | Engel | 395/24 |
| 5,052,043 | 9/1991 | Gaborski | 382/14 |
| 5,103,496 | 4/1992 | Andes et al. | 395/24 |
| 5,150,450 | 9/1992 | Swenson et al. | 395/23 |
| 5,201,029 | 4/1993 | Jackson | 395/27 |
| 5,214,743 | 5/1993 | Asai et al. | 395/27 |
| 5,220,641 | 6/1993 | Shima et al. | 395/24 |
| 5,222,210 | 6/1993 | Leivian | 395/12 |
| 5,294,197 | 3/1994 | Takenaga et al. | 382/14 |
| 5,297,237 | 3/1994 | Masuoka et al. | 395/24 |
| 5,299,286 | 3/1994 | Imondi et al. | 395/27 |
| 5,402,519 | 3/1995 | Inoue et al. | 395/22 |
| 5,479,541 | 12/1995 | Parlos et al. | 395/23 |
| 5,479,575 | 12/1995 | Voda | 395/23 |
| 5,553,159 | 9/1996 | Takeo | 382/156 |
| 5,553,196 | 9/1996 | Takatori et al. | 395/22 |
| 5,555,439 | 9/1996 | Higashino et al. | 395/23 |
| 5,577,166 | 11/1996 | Mizuno | 395/22 |

OTHER PUBLICATIONS

Rumelhart et al., "Learning Representations by Back--Propagating Errors", Nature, vol. 323, Oct. 1986, pp. 533–536.

Kohonen, "Self–Organization and Associative Memory", 3rd Edition, Feb. 1990, pp. 199–209.

*Primary Examiner*—George B. Davis
*Attorney, Agent, or Firm*—Foley & Lardner

[57] ABSTRACT

An information recognition circuit comprises a plurality of recognition processing units each composed of a neural network. Teacher signals and information signals to be processed are supplied to a plurality of the units, individually so as to obtain output signals by executing individual learning. Thereafter, the plural units are connected to each other so as to construct a large scale information recognition system. Further, in the man-machine interface system, a plurality of operating instruction data are prepared. An operator's face is sensed by a TV camera to extract the factors related to the operator's facial expression. The neural network analogizes operator's feeling on the basis of the extracted factors. In accordance with the guessed results, a specific sort of the operating instruction is selected from a plurality of sorts of the operating instructions, and the selected instruction is displayed as an appropriate instruction for the operator. Further, the one-loop controller for automatizing operation comprises an input interface section for acquiring image information, an image recognition section for recognizing the image using the acquired image information, a control section for calculating control commands according to the image recognition results, and an output interface for outputting control commands to process actuators or subordinate controllers, respectively.

1 Claim, 36 Drawing Sheets

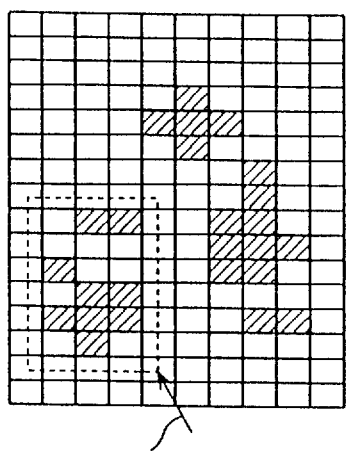
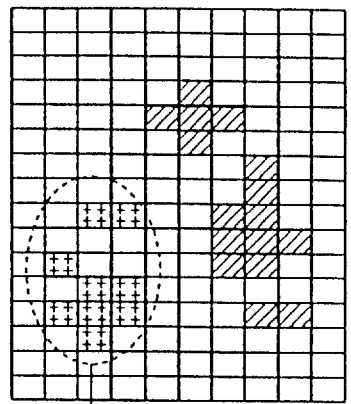
CLUSTER CLASSIFY
BY MOUSE POINTER
RECOG'ED AS SAME
CLUSTER
(SAME CLUSTER ADDRESS
 ALLOCATED)
FIG.6A
FIG.6B

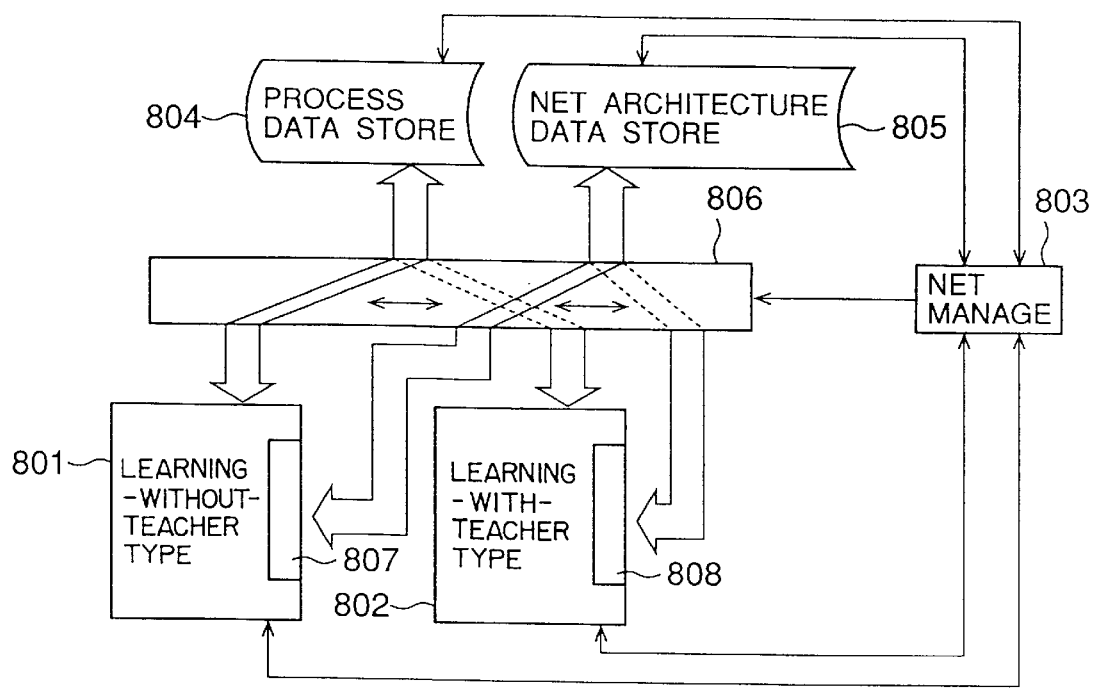
FIG.10
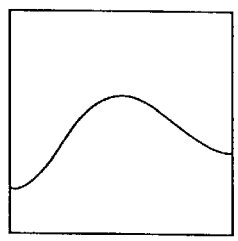 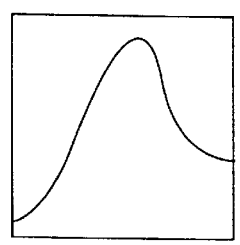 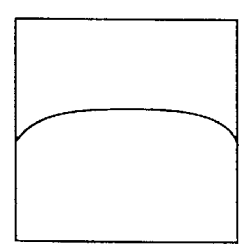
FIG.11A     FIG.11B     FIG.11C
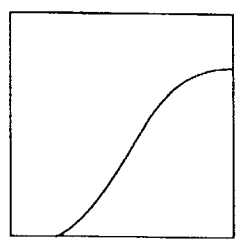 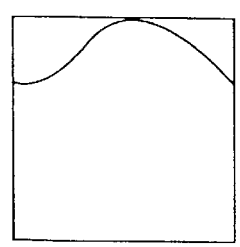 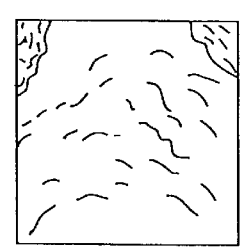
FIG.11D     FIG.11E     FIG.11F

IF PATTERN IS 1, INCREASE PRESS SET VALUE & DECREASE FLOW RATE SET VALUE

IF PATTERN IS 2, INCREASE PRESS SET VALUE & KEEP FLOW RATE SET VALUE

IF PATTERN IS $n_M$, DECREASE PRESS SET VALUE & INCREASE FLOW RATE SET VALUE

FIG.35

INFORMATION RECOGNITION SYSTEM AND CONTROL SYSTEM USING SAME

This application is a divisional of application Ser. No. 08/208,584 filed Mar. 11, 1994, U.S. Pat. No. 5,619,619.

BACKGROUND OF THE INVENTION

1. Field of the Invention

The present invention relates to an information recognition system and control systems using the same recognition system, and more specifically to an information recognition system for processing large scale information such as image data or speech data that are huge in the information quantity and redundant in the representation format.

2. Description of the Prior Art

The conventional information processing system has been so far constructed by a CPU based upon a Neumann-type computing system usually. Further, the processing speed of the information has been improved by increasing the processing speed of the CPU itself or by connecting a plurality of CPUs in parallel to each other for simultaneous processing.

In the conventional processing system, however, since the systems is not provided with means for learning the information recognition criteria for itself, it has been so far necessary to give the information recognition criteria to the processing system previously in the form of programs manually. However, in order to recognize large scale data, a great number of recognition rules must be given to the processing system without inconsistency, with the result that it has been practically impossible to realize the large scale information recognition processing.

On the other hand, it has been well known that there exists a neural network as an apparatus for learning the recognition criterion automatically. The neural network is composed of a great number of neurons. The input and output relationship of each of the neurons is given in the form of Zigmond function, for instance. Further, these neurons are coupled to each other hierarchically via appropriate weight coefficients adjusted in such a way that the input and output signal relationship of the whole circuit can be approximated to the input-teaching data relationship. As the adjusting method, a back propagation method is well known such that the input data and the teaching data are given repeatedly in order to acquire the recognition criteria automatically.

In the conventional neural network, however, the input and output signal relationship of the whole circuit is learned integrally, in both the cases where the network is realized as software by the computer and where the network is realized as hardware by analog or digital circuits. Accordingly, when the large scale data are learned to acquire a great number of recognition rules, since the number of learning repetitions increases greatly, it has been also impossible to realize the large scale information recognition processing even with the use of the neural network.

As described above, the conventional information recognition system is the Neumann-type recognition system which it is difficult to determine the recognition rules, or the integral-type neural network which can learn the recognition rules automatically but is difficult for processing the large scale data.

In the case where large scale data are processed by the conventional information recognition system, in order to set the information processing load as low as possible, the basic steps are to select the feature variables along the object of the final classification recognition and to compress the information in accordance with the information compression processing represented by the feature extraction. In practice, when appropriate feature variables (some scaler quantities, in many cases) can be selected, it is possible to fairly reduce the overall processing load thereof.

In the recognition systems actually required in the process control, however, it is not only difficult to always select the feature variables having sufficient information required for the final object, but also there exists the case where the effective feature variables cannot be obtained under the actual environment of the recognition processing execution.

To overcome the above-mentioned problem, therefore, various parallel processing techniques have been recently adopted in practice with the advance of the improvement in the computation capability. Among these, in particular, the neural network is expected as an effective method of classifying and recognizing large scale data in both the learning with teaching-data type network and the learning without teaching-data type neural network. The neural network technique has been so far widely applied in the fields of character and speech recognition. However, it is reported that the overall recognition rate can be improved by combination of the conventional recognition processing method with the neural network technique. For instance, there exists a system in which a character recognizing apparatus constructed by a conventional Neumann type computer is combined with a neural network recognizing apparatus. In this system, although the recognition rate of 95% or more is obtained, the neural network is used only to improve the recognition rate by 2 to 3%.

In the general image recognition, however, it is rather difficult to utilize the conventional recognition processing technique effectively as described above, so that the recognition processing load is often increased markedly on the neural network side. In addition, in the case of the learning with teaching-data network widely used in the image recognition processing, it is very difficult to decide an effective network architecture in the learning processing (which is important process for realizing the detailed recognition and classification system). That is, there exists such a decisive drawback that the learning itself cannot be converged abruptly with increasing number of data to be classified and/or recognized.

To overcome the above-mentioned problem, it may be possible to adopt the learning without teaching-data type network (which is less in stagnation of the overall learning processing) as the central network architecture. In the case of the learning without teaching-data type network, although being effective to the rough category classification, it is often difficult to classify or recognize the detailed categories.

On the background as described above, recently, a combination of the network without teaching data and the network with teaching-data has been proposed such that feature extraction processing is executed previously to some extent by the network without teaching-data and then the output is given to the network with teaching-data for learning of the data classification capability.

In the above-mentioned combined system as described above, however, when the amount of data to be processed increases hugely, there still exists a problem in that it is difficult to construct a system which can sufficiently recognize and classify the huge data under a practical load (e.g., the number of design items) considered by the current computer technology.

There has been so far known such a system which is the combination of the above two types of networks. This system includes a learning without teaching-data type neural network and a plurality of learning with teaching-data type neural networks. In the case of the learning without teaching-data type neural network, since the processing required for the architecture is only one, exist no wasteful processing. In the case of the learning with teaching-data type neural networks, however, since the network processing apparatuses corresponding to the number of the processing steps are required (in spite of the network processing in the same architecture), there exists inevitably a wasteful processing.

In particular, when the neural network processing apparatus is an individual processing board, the hardware resources required for the system construction excessively increase, so that it becomes impossible to coexist with other systems without any practicability.

Here, in the case of the large scale neural networks having great numbers of the inputs and outputs and the intermediate layers are constructed, if each neural network element is constructed by a single hardware element one by one, the number of the hardware elements becomes huge and thereby the number of connections also increases extraordinarily. As a result, the reliability of the neural network system is deteriorated and in addition a very wide space is required for the hardware.

To overcome the above-mentioned problem, it is possible to construct an apparent neural network composed of a plurality of neural network elements in the form of software, by controlling the input/output signals of the single neural network hardware element in accordance with computer software. In more detail, the weight coefficient data between the neural network elements and the input/output signal data of the respective neural network elements are read into a computer through an external bus, calculated by a CPU of the computer, and then transferred to the neural network elements through the external bus as the connection weight data between the neural network elements and the input/output signal data.

In this method, however, since it takes much time to transfer data between the neural network and the computer through an external bus, and further since the general purpose CPU of the computer does not necessarily function as an optimum neural network element, a huge time is required for the large scale neural network learning and the data propagation in the forward propagation direction. That is the first point of the problem related to the invention described here.

Next, in order to describe an operation of a new data recognition system to a man-machine interface, some problems of a graphical man-machine interface apparatus will be described hereinbelow.

For instance, a human face changes in various ways according to his feeling or mind. Therefore, it is possible to consider that the human face includes a lot of useful information. In the conventional graphical man-machine interface apparatus, however, the operation thereof has been executed irrespective of the expression of the operator's face, that is, the various operator's information. As a result, some problems have been so far proposed from the user's or operator's standpoint.

One of the above-mentioned problems relates to a cash dispenser installed in various banking organizations such as banks or post offices. In the cash dispenser, the operation required for transferring money to another bank is complicated in particular. Although the guidance of operation procedure and inputted contents are displayed on a display picture, the displayed instruction is often difficult for some operators to understand. That is, the operation may be simple and easy for the persons accustomed thereto. However, this man-machine interface apparatus is very troublesome to the person who operates the apparatus on rare occasions or who is poor in handling machines.

In other words, in the conventional man-machine interface apparatus, a predetermined operation sequence is required for the operator irrespective of the operator's skill. To facilitate the operation, the graphical user interfaces have been so far widely used. In this case, however, some knowledge over a predetermined level is required for the operator in advance. Further, there exists an interface apparatus such that two different operation sequences are prepared in advance according to the operators different in skill so that the operator can select any one of them. However, this interface apparatus is still not satisfactory. The reason is as follows: Since the operation is explained in accordance with a predetermined sequence irrespective of the feeling of the operator now operating the system, the operation sequence is not well understandable for the non-skilled person so that stress may be caused, or in contrast with this, the skilled person may be irritated. Further, when the apparatus is operated by the non-skilled person, since the apparatus workability is lowered, another skilled advisor is necessary. As described above, when the man-machine interface apparatus is used as machines for selling products, since the machine makes a cool impression on the user's mind, the man-machine interface apparatus has been so far used for only automatic vending machines.

Next, another problem concerned with man-machine interface apparatus will be described hereinbelow. Although the above-mentioned problems are widely noticed in the field of the man-machine interface apparatus, there exists another problem with respect to the person skilled in computer operation to some extent. The problem is related to the operation of entering data to the machine through a display picture, in particular with respect to use of a pointing device. As the pointing devices, a touch pen, mouse, etc. are so far known. In these pointing devices, a pointer must be shifted by the operator's hand, so that a relatively large motion is required for the operator whenever the pointer is required to be shifted. For instance, when a cursor on a display picture is moved with the use of a mouse, the operator must first take a mouse with his hand, move the mouse on a predetermined place (a mouse pad, a desk, etc.), and then click the button on when the cursor is located. In these operation, since some motional actions are required for the operator, there exists the case where the cursor cannot be shifted to a desired position along a considered locus, thus causing a vicious cycle of irritation and erroneous operation, in spite of the fact that a quick operation is required for the operator.

In summary, in the conventional man-machine interface apparatus, since the manipulation is not related to the feeling of the operator's face, there exists a problem in that the manipulatability of the interface apparatus is not satisfactory.

Next, in order to describe another application of the new data recognition system to a control system used in some industrial plants, some problems of general control system or controller will be described hereinbelow.

A one-loop controller has been so far known, by which various operation parameters of a plant can be controlled using image data of an object to be controlled.

In the conventional one-loop controller, the operation of a plant has been automatized by inputting various measured values such as pressure, flow rates, temperatures, etc. and further controlling the process variables by operating various actuators with proportional, integral and differential calculations as feed-back control action.

In the conventional one-loop controller, however, since only one-dimensional information is processed, it has been impossible to adjust the operation parameters of a plant using the operating conditions observed by the operator; that is, image (two-dimensional) information.

Further, when fuzzy inference is adopted as the control algorithm for the one-loop controller, the rules and the membership functions used for the fuzzy inference must be adjusted at the initial setting stage in many cases. However, since the above-mentioned one-loop controller is not provided with on-line adjustment functions, great labor is required to adjust the rules and the membership functions.

Further, in the conventional one-loop controller, since several-hundred control loops are controlled simultaneously to realize a simple maintenance, an independent controller is allocated to each control loop, and these controllers are used as one-loop controller in combination. That is, a plurality of one-loop controllers are mounted on a rack so that a great number of loops can be monitored by a single panel. Therefore, the shape of the controller panel is usually narrow in the width direction and long in the depth direction. Since the front surface of the controller panel is narrow, the plant operation parameters (controlled variables, set point values, manipulated variables of plants, etc.) are displayed on simple meters arranged on the control panel, so that a plotter, for instance, is additionally necessary to check the time trends Further, even if monitor screens are provided in the front surface of the controller panel, the displayed picture surfaces are narrow, so that the manipulatability is low.

Further, in the case of the visual feedback control based upon image recognition and image information with the use of the neural network, it is necessary to first execute the learning operation of the neural network by use of a great number of teaching data. A problem which has arisen in the conventional feedback control will be explained. The image recognition by use of the neural network can be executed in accordance with the following procedure: First, features are extracted from a great number of learning image data, and the image data are classified according to several categories on the basis of the extracted features (in the case of image data having the same features with respect to several evaluation criteria). Thereafter, a great number of learning image data are inputted to the neural network, and the neural network learning is executed until the outputs of the neural network can be roughly equalized to each other for the inputted learning image data belonging to the same category. In other words, since the image recognition precision and the convergent speed of the neural network are dependent upon the classification precision of the learning image data, when the feature extraction and the classification method of the learning data are not appropriate, it is impossible to allow the neural network to learn image data, so that the image recognition itself of the neural network is deteriorated. Conventionally, when the image data are recognized by the neural network, a skilled operator observes image data one by one independently and compares the observed image data with appropriate data at need in order to classify the image data into several categories. In this case, however, since the number of image data required for the neural network is huge, so that it is extremely difficult for the skilled operator to classify the image data on the basis of universal criteria. As a result, there exists many cases where the image data having the similar features are classified into other categories, so that it has been difficult to improve the image data learning efficiency and the image recognition precision.

There has been another problem arisen in the conventional feedback control. When the shape recognition is executed using image information and the neural network learning, since there exist no indices for setting appropriate initial values of the coupling weights between the mutual nodes of the neural network, the initial values have been so far determined on the basis of random numbers. However, a long time is required for such an initial learning that the coupling weights must be tuned until a constant effect can be obtained after the random numbers have been set, so that the efficiency is low. In addition, when the shape recognition is executed on the basis of image information of low S/N ratio, the outputs of the neural network are unstable, so that the system reliability is low.

SUMMARY OF THE INVENTION

With these problems in mind, therefore, it is the object of the present invention to provide an information recognition system which can process the large scale information stably. To achieve the above-mentioned object, the present invention provides an information recognition system, comprising: a plurality of recognition processing units each composed of a neural network; a plurality of teacher signal transmission lines for supplying teacher signals to each of a plurality of said recognition processing units, individually; a plurality of processed data transmission lines for supplying data to be processed to each of a plurality of said recognition processing units, individually; a plurality of output signal transmission lines responsive to the teacher signals and the processed data, for outputting output signals to each of a plurality of said recognition processing units, individually; and means for connecting each of a plurality of said output signal transmission lines to a plurality of said processed data transmission lines, respectively.

Further, the present invention provides an information recognition system, comprising: a category classification apparatus for roughly classifying data to be processed by a plurality of stages of learning without teacher-data type neural networks; and a category recognition apparatus for finally recognizing the data to be processed by a learning with teacher-data type neural network, for each category classification decided as a final stage output of said category classification apparatus.

Further, the present invention provides an information recognition system, comprising: first recognition processing means composed of at least one learning without teacher-data type neural network, functions of said first recognition processing means being decided when predetermined construction information for said learning without teacher-data type neural network has been set; second recognition processing means composed of at least one learning with teacher-data type neural network, functions of said second recognition processing means being decided when predetermined construction information for said learning with teacher-data type neural network has been set; first storing means for storing the construction information of the teacher-absent and learning with teacher-data type neural networks; second storing means for storing the information to be processed by said first and second recognition processing means; and control means for executing a plurality of sorts of recognition processing by switching said first and second recognition processing means and switching the setting information stored in said first and second storing means.

According to the information recognition system of the present invention, since a plurality of neural networks for sharing the predetermined functions, respectively can be learned individually and since an overall recognition processing can be achieved in combination of these neural networks, it is possible to realize the information recognition system which can automatically acquire a great number of recognition rules on the basis of a great number of learning data, which has been so far not realized. Further, the number of iterative calculations required for acquiring rules can be reduced down to a practical number. In addition, since each neural network unit can be composed of about several tens of neurons in general, the number of the coupled circuits can be reduced down to a realizable number. Further, since the coupling circuits between the units can be composed of the input and output signal lines between the respective units, the number of the circuits is realizable. Therefore, it is possible to solve the problem in that the number of the coupling circuits increases drastically, which has been so far involved in the conventional large scale neural network system.

Further, in the case where the category classification by the clustering processing is executed at a plurality of stages, as far as the number of learning data belonging to the finally classified categories is sufficiently reduced, it is possible to roughly secure the convergence of the learning by use of the category classification recognition system provided with a hierarchical neural network architecture. Therefore, it is possible to construct the recognition system under the practical engineering load and further to realize appropriate high-speed recognition and classification for a large scale data group.

Further, in the case of the conception such that a limited number of network hardware resources can be used as a great number of networks by switching data inputted to the network hardware resources, the processing executed by a great number of neural networks can be realized by a minimum possible number of practical processors, thus allowing the large scale data recognition to be applicable to various fields in practice. Further, in the case of a single-chip neural network system, since a large scale neural network system can be realized without increasing the number of neural network hardware elements, the space required for the neural network system and the number of the connection wires can be reduced. Accordingly, the reliability of the neural network system can be improved. Further, since the data can be transferred between the neural network hardware elements and the neural network storing RAM through the internal bus constructed within the same chip, the data can be transferred at high speed, so that it is possible to shorten the calculation time required for the neural network system. In addition, since these elements can be constructed on the same chip, it is possible to improve the reliability of the hardware elements.

Further, another object of the present invention is to provide a graphical man-machine interface system which can extract useful information from the image data indicative of an operator's face and control the operating display instruction on the basis of the extracted information to display an operating instruction suitable for the operator.

To achieve the above-mentioned object, the present invention provides a man-machine interface system, comprising: image sensing means for obtaining image signals indicative of an operator's face; image recognizing means for extracting factors related to operator facial expressions from the image signals obtained by said image sensing means, recognizing operator feeling from the extracted factors, and outputting recognition results as image recognition signals; a display apparatus; instruction data storing means for storing a plurality of sorts of machine operating instruction data; and display control means for selecting specific sort of the machine operating instruction data from a plurality of sorts of the machine operating instruction data according to the image recognition signals, and for controlling the display apparatus to display the selected instruction data as the machine operating instruction suitable for the operator.

Further, the present invention provides a man-machine interface system, comprising: image sensing means for obtaining image signals indicative of an operator's face; image recognizing means for extracting factors related to operator facial expressions from the image signals obtained by said image sensing means, recognizing operator's eye positions on a display picture by the extracted factors, and outputting recognition results as image recognition signals; displaying means; and display control means for displaying a pointer on said displaying means according to the image recognition signals indicative of the operator's eye positions.

In the man-machine interface system according to the present invention, since the skillfulness of the operator can be discriminated on the basis of the image signals and further since an appropriate display instruction can be selected according to the operator's skillfulness, it is possible to realize the interface system suitable for the operator.

Further, in the man-machine interface system according to the present invention, since the eyes of the operator are detected by the image signals and further since the pointer is controllably moved according to the operator's eyes, it is possible to move the pointer freely on the display picture whenever the operator moves his face or eyes, so that it is possible to realize a quick and comfort operation.

Further, the other object of the present invention is to provide a one-loop controller for automatizing process operation, and an apparatus for displaying image data and an apparatus for inputting neural network connection weights, both suitable for the one-loop controller.

To achieve the above-mentioned object, the present invention provides a one-loop controller for feedback controlling operation, related to shapes of an object to be controlled using image signals indicative of the object, comprising: an input interface section for converting an observed image of the object to be controlled into image data; an image processing section for extracting a plurality of sorts of feature parameters of the observed image from the extracted image data; a recognition section for recognizing the observed image using the basis of a plurality of sorts of the feature parameters; a control section for generating control commands on the basis of the recognized results of the image; and an output interface section for outputting the control commands to controllers for the process.

Further, the present invention provides a one-loop controller, comprising: simulating means for simulating control operation for adjusting control parameters using an observed image indicative of an object to be controlled; means for displaying the observed image indicative of the object to be controlled; means for acquiring image data at predetermined times or predetermined time intervals; means for storing the acquired image data; and means for displaying the stored image data of a predetermined range on said displaying means as sampled image data to be given to said simulating means.

Further, the present invention provides a one-loop controller, comprising a plane image display device accommodated on one of left and right sides of and within said controller so as to be drawn frontward away from the controller.

Further, the present invention provides an image data displaying apparatus for the visual feedback controller, comprising: means for displaying a plurality of image data on a display picture; means for classifying the image data into categories determined on the basis of some evaluation criteria; and means for simultaneously displaying a plurality of image data belonging to the categories classified by said classifying means on said displaying means.

Further, the present invention provides a neural network coupling weight inputting apparatus for the visual feedback controller, comprising: means for inputting connection weights at a plurality of nodes of an input layer of a neural network for recognizing an image pattern nodes between a plurality of nodes of intermediate layers of the same neural network, to the neural network; means for displaying an image to be controlled on a display picture by dividing an image region into a plurality of regions according to the nodes of the input layer of the neural network; means for designating at least one of the nodes of the intermediate layers of the neural network; means for determining the connection weight by designating a divided area on the display picture by the designating means, to input the connection weight to the neural network.

BRIEF DESCRIPTION OF THE DRAWINGS

FIGS. 6A and 6B are illustrations for assistance in explaining each-stage cluster designation processing by use of a pointing device in the construction processing of the learning without teacher-data type neural network which constitutes the category classification apparatus;

FIG. 10 is a block diagram showing another modification of the information recognition system according to the present invention;

FIGS. 11A, 11B, 11C, 11D, 11E, and 11F are illustrations showing various examples of the char bed shapes;

FIG. 35 is an illustration showing an embodiment of an operation display picture for realizing the rule correcting function;

DETAILED DESCRIPTION OF THE PREFERRED EMBODIMENTS

The embodiments of the information recognition system according to the present invention will be described hereinbelow with reference to the attached drawings.

Figure 1A:
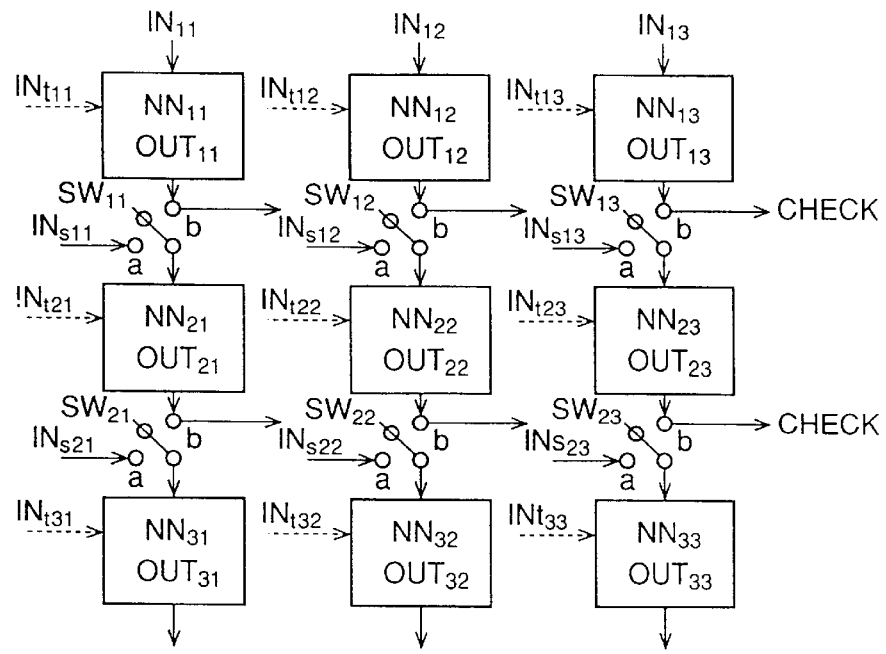
FIG. 1A is a block diagram showing a neural network board of an embodiment of the information recognition system according to the present invention.
Figure 1B:
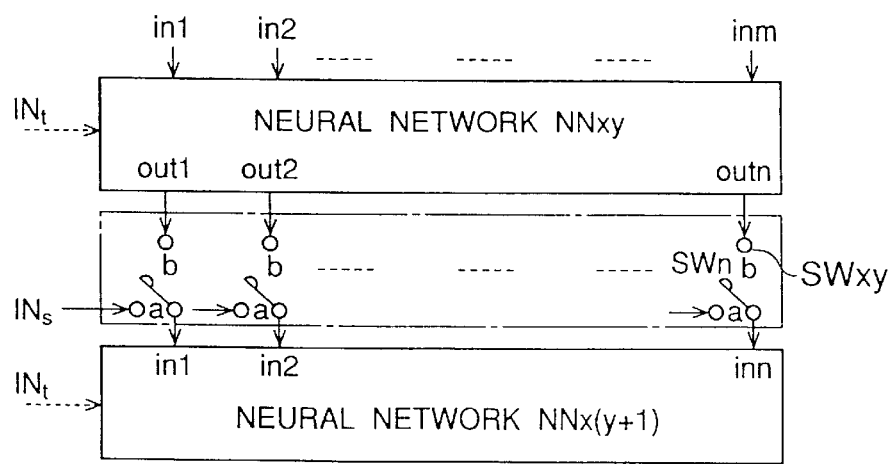
FIG. 1B is an enlarged block diagram showing the same neural network board shown in FIG. 1A.

The information recognition system according to the present invention shown in FIGS. 1A and 1B is constructed by a plurality of neural network units NN. Each neural network unit NN can execute learning individually on the basis of learning data INs and teaching data INt inputted thereto independently.

A change-over switch SW is connected between the respective units NN. The output terminal OUT of each unit NN is connected to one input terminal b of the switch SW, and learning data INs are supplied to the other input terminal a of the switch SW.

FIG. 1B is an enlarged view showing each unit NN and each switch SW. FIG. 1A shows only one input line and one output line and one switch corresponding to each unit for brevity. In practice, however, as shown in FIG. 1B, each unit NN is provided with a plurality of input and output lines, and the same number of switches SW are provided so as to correspond to the input and output lines of each unit NN, respectively.

In learning, each change-over switch SW is set to the terminal a, so that learning data INs and teaching data INt are given to each unit NN. Each unit NN keeps learning until the respective output signals of each unit converge independently. The output signals of each unit are outputted from the output terminals OUT via the terminals b of the switches SW, so that it is possible to check the learning status. Upon convergence of the respective units NN, all the change-over switches SW are set to the terminals b, so that it is possible to construct a large scale neural network board composed of combinations of the respective functions. When respective data $IN_{11}$, $IN_{12}$ and $IN_{13}$ to be recognized are given to the respective first-stage units $NN_{11}$ $NN_{12}$ and $NN_{13}$ of the neural network constructed as described above, these units recognize the given data in accordance with the learned recognition rules. The recognition results outputted from the output terminals $OUT_{11}$, $OUT_{12}$ and $OUT_{13}$ of the units $NN_{11}$ $NN_{12}$ and $NN_{13}$ are given to respective second-stage units $NN_{21}$ $NN_{22}$ and $NN_{23}$ via the switches $SW_{11}$, $SW_{12}$ and $OUT_{13}$. Further, these recognition results of these units are further given to respective third-stage units $NN_{31}$ $NN_{32}$ and $NN_{33}$ via the switches $SW_{21}$, $SW_{22}$ and $OUT_{23}$, respectively, so that the final recognition results are outputted from the output terminals $OUT_{31}$, $OUT_{32}$ and $OUT_{33}$ of the units $NN_{31}$ $NN_{32}$ and $NN_{33}$, respectively.

Further, in the above-mentioned description with reference to FIGS. 1A and 1B, although the input and output lines and the change-over switches have been described as hardware representation, in practice these elements may be constructed as software on a computer.

Figure 2:
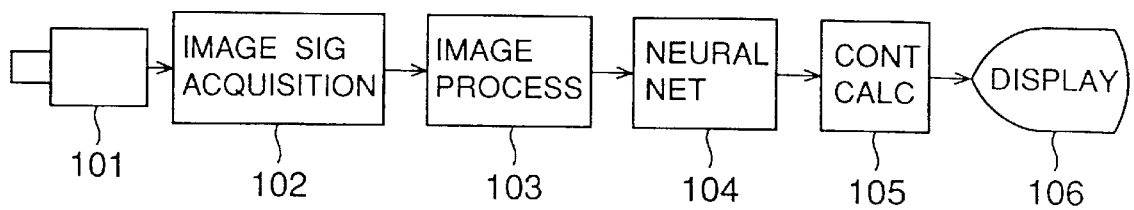
FIG. 2 is a block diagram showing an image recognition apparatus in which the neural network boards as shown in FIGS. 1A and 1B are,incorporated.

FIG. 2 shows an image recognition control apparatus, to which the neural network board constructed as described above is applied.

In FIG. 2, the control apparatus first obtains an image signal detected by a TV camera 101. Since being of NTSC signal, the obtained image signal is converted into digital signals by an image signal acquisition board 102. On the basis of the converted digital signals, an image processing board 103 extracts the features of an object to be recognized. The features are determined by detecting the edges of a picture, brightness of the whole picture, the gravity center of an object to be image sensed, etc. On the basis of the signals of the image processing board 103, a large scale neural network board 104 recognizes and decides the object in accordance with the learned recognition rules. The recognized results are outputted to a control calculation processing board 105. The control calculation processing board 105 outputs a control signal in accordance with a predetermined logic.

The operation of the image processing board 103 and the large scale neural network board 104 will be described hereinbelow with reference to FIGS. 3A to 3C.

Figures 3A, 3B, 3C:
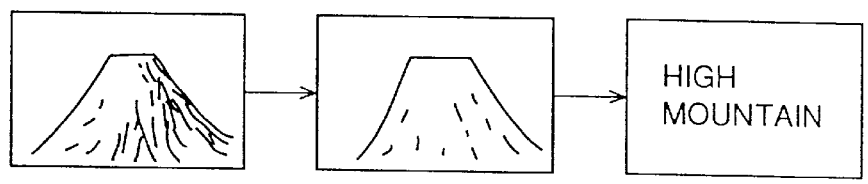
FIGS. 3A, 3B and 3C are illustrations showing an example of the operation of the apparatus shown in FIG. 2.

FIG. 3A shows an original picture taken by the TV camera 101. Being slightly deteriorated by the digitization processing, the image signal equivalent thereto is inputted to the image processing board 103. Processing the received image signal, the image processing board 103 outputs a picture as shown in FIG. 3B, when an edge detection is instructed to the image processing board 103. On the basis of the picture outputted by the image processing board 103 as shown in FIG. 3B, in the case where the large scale neural network board 104 learns the decision of a mountain height for instance, the neural network board 104 outputs a display of "high mountain"(which is a decision result) as shown in FIG. 3C. The above-mentioned decision results can be changed freely in dependence upon the learning data and the teaching data both obtained in the learning step.

With the use of the decision function of the neural network board 104, it is also possible to decide human facial expression or to analogize human feeling. In this case, the following learning are executed for instance: eyes, eyebrows and a mouth are extracted on the basis of the whole face image data in order to decide the human facial expression.

In more detail, in the respective units NN as shown in FIG. 1A (which correspond to the neural network board 104 in FIG. 2), the roles are allocated to the respective units NN, for instance as follows: the neural network unit $NN_{11}$ extracts eyes from the whole face picture; $NN_{21}$, corrects the positions and sizes of the extracted eyes in accordance with the recognition rules; $NN_{31}$ detects a tense eye pattern; $NN_{12}$ extracts eyebrows from the whole face picture; $NN_{22}$ corrects the positions and sizes of the extracted eyebrows; $NN_{32}$ detects a tense eyebrow pattern; $NN_{13}$ extracts a mouth from the whole face picture; $NN_{23}$ corrects the positions and sizes of the extracted mouth in accordance with the recognition rules; $NN_{33}$ detects a tense mouth pattern, respectively.

In this case, the image data representative of the whole face are given as the learning data for the unit $NN_{11}$, and the data indicative of the eyes are given as the teaching data. Further, every possible patterns are given and learned until the image signal output indicates the eyes. By the above-mentioned learning, the unit $NN_{11}$ connotes the overall feature detecting capability including the eye shape and the positional relationship between the eye shape and the other parts in the face, so that it is possible to specify the eyes from the whole face image, in the same way as with the case where a man can judge the presence of the eyes by seeing the face.

As the learning data of the unit $NN_{21}$, various patterns indicative of eyes of various sizes existing at various positions (i.e., various patterns expected to be outputted from the unit $NN_{11}$ when the system is used in practice) are given. As the teaching data, the patterns corresponding thereto and further corrected in position and size are given. The learning is repeated on the basis of the given learning and teaching data. Accordingly, the unit $NN_{21}$ can output soon an eye pattern obtained by correcting the eyes of various sizes existing at various positions to the eyes of a constant size existing at constant positions.

As the learning data of the unit $NN_{31}$, various size eye patterns of a determined eye size existing at determined positions (i.e., various patterns predicted to be outputted by the unit $NN_{21}$,) are given, and the data indicative of whether the corresponding pattern is a tense pattern ((1) Positive) or not ((0) Negative) are given as the teaching data. The learning is repeated until the answer of (1) or (0) can be obtained at a constant rate (i.e., until a correct answer can be obtained except the case where it is difficult for a man to discriminate whether the eyes indicate tense feeling or not).

The same as above is applied to the case of the eyebrows and mouth. In summary, the image data (learning data) indicative of the whole face and the image data (teaching data) indicative of the eyebrows are given to the unit $NN_{12}$. Further, the eyebrow patterns (learning data) of various sizes existing at various positions and the eyebrow patterns (teaching data) of a predetermined size existing at predetermined positions are given to the unit $NN_{22}$. Further, the various eyebrow patterns (learning data) of various shapes of a predetermined size existing at predetermined positions and the data indicative of whether the corresponding patterns is a tense pattern ((1) Positive) or not ((0) Negative) are given to the unit $NN_{32}$ for respective learning.

In the same way, the image data (learning data) representative of the whole face and the image data (teaching data) indicative of the mouth are given to the unit $NN_{13}$. Further, the mouth patterns (learning data) of various sizes existing at various positions and the mouth patterns (teaching data) of a predetermined size existing at a predetermined position are given to the unit $NN_{23}$. Further, the various mouth patterns (learning data) of various shapes of a predetermined size existing at a predetermined position and the data indicative of whether the corresponding patterns is a tense pattern ((1) Positive) or not ((0) Negative) are given to the unit $NN_{33}$ for respective learning.

Further, after the respective learning have been converged, the respective change-over switches SW (i–1)j are set to the b side. In the practical use, it is possible to obtain a final decision owing to the linking functions of the respective units $NN_{ij}$. As described above, in the large scale information recognition system of the present invention, it is possible to acquire a great number of recognition rules automatically on the basis of a great number of learning data, which have been so far not realized. Further, the number of the repetitive calculations required to acquire the rules is an actual computation number. Further, since each of the neural network units is composed of several tens of neurons in usual, the number of the coupling circuits is a realizable number. Further, since each of the coupling circuits between the units is also composed of buses of input signals and output signals applied to and from each unit, the number of the circuits is an easily realizable number, so that it is possible to prevent the number of the coupling circuits from being increased drastically (which has been so far involved in the conventional neural network circuit).

Another embodiment of the information recognition system according to the present invention will be described hereinbelow.

The final object of the information recognition system is to recognize or classify data to be processed on the basis of some featured characteristics included in the data themselves. However, in the case where the feature variable index which can represent the featured characteristics effectively in the form of compression is not known definitely, the classification is to be featured by the representative data for each category to be classified. In other words, it is necessary to construct a system which can designate essential characteristics on the basis of the representative data collected for each category and further classify the newly obtained data into appropriate categories appropriately.

Therefore, the recognition system on the basis of category classification will be described with reference to FIG. 4. First, information recognition system of the present embodiment is roughly composed of a category classifying apparatus 401, a neural network switching apparatus 402, and a category recognizing apparatus 403. The category classifying apparatus 401 roughly classifies data to be processed by plural stages of learning without teaching-data type neural networks. For instance, in the case of the character recognition of hand-written Japanese cursive (hiragana) characters, Chinese characters and Japanese syllabary (katakana), the category classifying apparatus 401 recognizes as to which character attribute the character to be recognized belongs to. The category recognizing apparatus 403 is provided with a plurality of teaching-present neural networks 4031, 4032, . . . 403n each having a function for recognizing each kind of characters (e.g., in the case of Japanese cursive characters, any one of (a), (j), (u), . . . in the order of Japanese alphabetical order) determined for each character attribute of these characters. The neural network switching apparatus 402 selects the neural network to be activated in accordance with the category data outputted by the final stage of the category classifying apparatus 401, and supplies information to be processed to the selected neural network.

Figure 5:
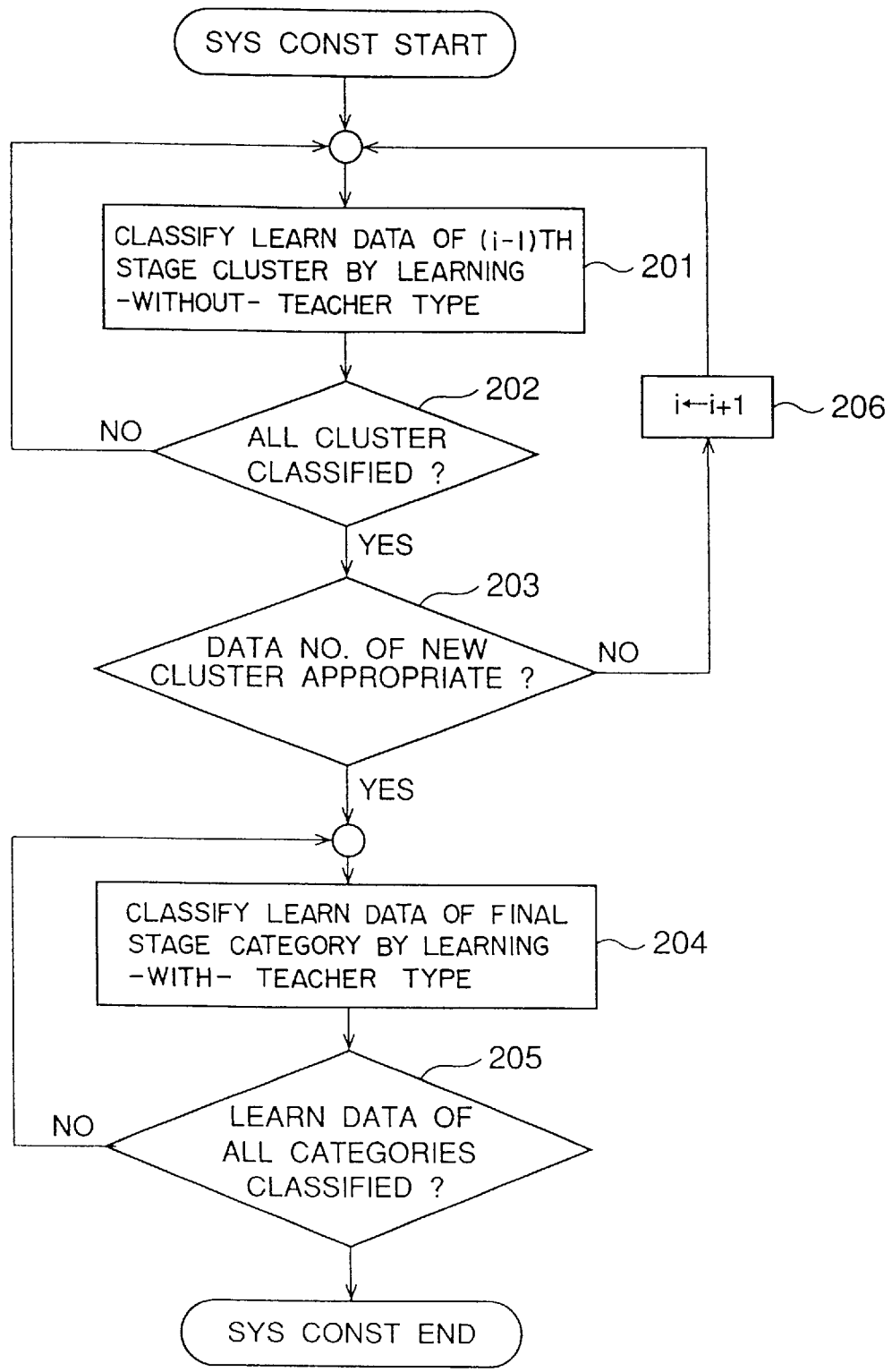
FIG. 5 is a flowchart for assistance in explaining the learning processing of the apparatus shown in FIG. 4.

FIG. 5 is a flowchart showing the procedure of the category classifying apparatus 401 and the category recognizing apparatus 403.

In FIG. 5, first in step 201, the learning data corresponding to the cluster at a stage are classified by the learning without teaching-data type neural network. Here, if the current classification stage is denoted by i, in step 201, one of a plurality of clusters at the (i–1) stage is classified. Successively, in step 202, control checks whether the classification of all the clusters has been completed or not, in other word, whether there still exists some clusters not yet classified. In the case where a cluster not yet classified exists, control returns to step 201. As described above, the clusters at the first stage are repeatedly classified in steps 201 and 202. Further, as the results of the step 202, when all the clusters at the stage to be classified have been classified, control proceeds to step 203 to check whether the number of learning data corresponding to the new cluster is appropriate or not. In other words, control checks whether the cluster classification corresponds to the learning data to be processed by the learning with teaching-data type neural network in the later process and further whether the number of the data is appropriate as the number of the learning data, and in addition whether the number of the clusters exceeds the number of the categories to be classified or not or whether the number of learning data is excessively large or not. As the results of above-mentioned judgements, if the number of the learning data is not appropriate, for instance, control proceeds to step 206 to set further successive stages, returning to step 201.

As described above, the control steps 201 and 203 are repeatedly executed until the clusters can be classified into a number of clusters appropriate to the number of learning data for the learning with teaching-data type neural network. That is, a great number of learning data given as representative data for each category are to be classified into some clusters at each stage of the category classifying apparatus 401 by the learning without teacher-data type neural network. As the learning rules of the learning without teaching-data type neural network, it is possible to utilize the learning method represented by LVQ (Learning Vector Quantization) method (by T. Kohonenn: Self-Organization and Associative Memory (3rd Ed.), pp 199 to 209, Springer-Verlag (1989)) or other related and improved methods. To decide the clusters, the algorithm so far proposed can be used as it is. However, it is also possible to allow the system constructor (operator) to have charge of the cluster decisions. In particular, in the case where the process to be recognized includes some process executed by a person in usually, it is necessary to allow the system constructor to be positively related to the clustering processing in order to construct a desirable system. FIGS. 6A and 6B are illustrations showing the status where the cluster can be set by use of a pointing device such as a mouse or a touch pen. When an area is designated by a mouse pointer as shown in FIG. 6A, the data within the designated area are registered as the same cluster as shown in FIG. 6B. As described above, when the cluster is determined freely by use of a pointing device, it is possible to effectively classify the categories on the basis of the whole recognition processing.

Figure 4:
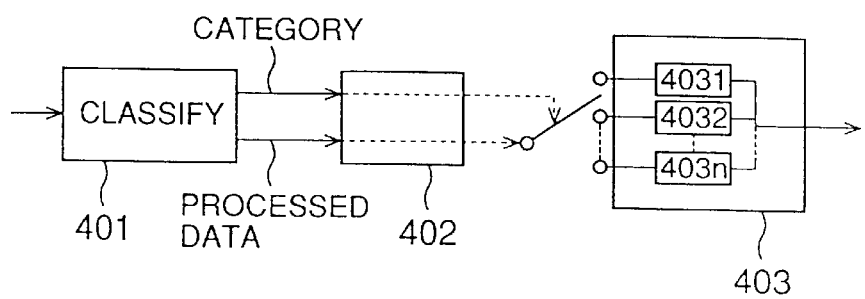
FIG. 4 is a block diagram showing the basic configuration of the apparatus for enabling category classification.
Figure 7:
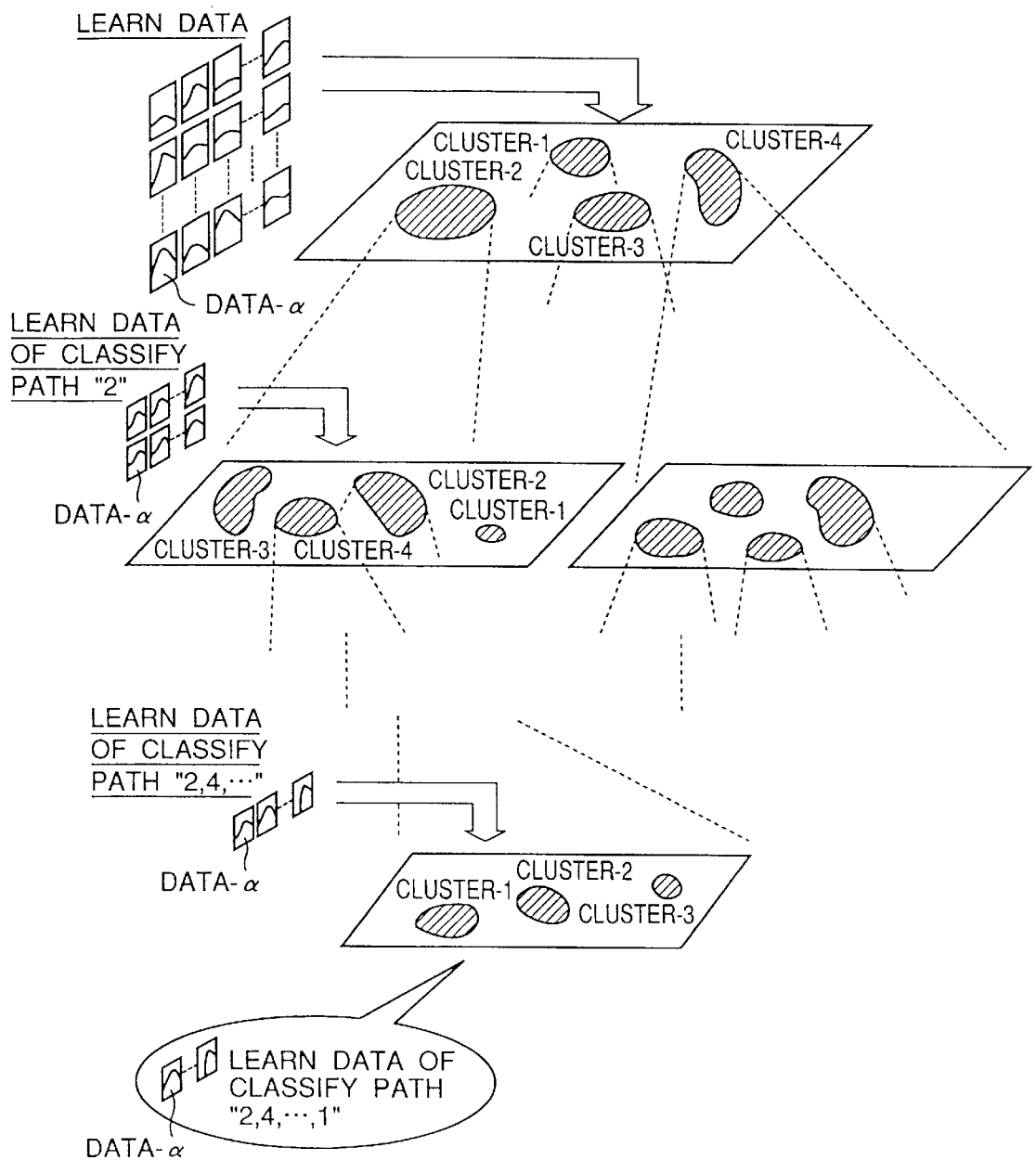
FIG. 7 is an illustration for assistance in explaining the classification processing of the learning without teacher-data type neural network which constitutes the category classification apparatus.

At the respective stages other than the first processing by the category classifying apparatus 401 as shown in FIG. 4, only the learning data belonging to each cluster are further classified for each cluster by the learning without teaching-data type neural network. FIG. 7 shows the status where the clusters are classified at a plurality of stages. By repeating the above-mentioned cluster classification, it is possible to finally obtain a tree structure in the cluster classification for the learning data through the processing by the learning without teacher-data type neural network. In FIG. 7, for instance, the classification address for the data $\alpha$ is given by (2, 4, . . . , 1) (i-th element denotes the belonging cluster number at the i-th stage), respectively. Accordingly, the category classifying apparatus 401 constructed by the classification functions of the learning without teacher-data type neural networks of a plurality of stages inputs data and outputs the classified categories in the form of directory path information of the belonging clusters at the final stage.

Further, the learning data for each classified category (whose number corresponds to the number of the directory paths) obtained at the final stage are learned with respect to the detailed correspondence relationship to the final recognition results in accordance with steps 204 and 205 shown in FIG. 5. That is, in step 204, single learning data is classified in detail. Further, after the data has been converged, in step 205 control checks whether there are non-processed learning data or not. As the results, if non-processed learning data still exist, control proceeds to step 204, and one of the remaining learning data is learned. As described above, when all the learning data have been classified in detail, the system processing ends.

Figure 8:
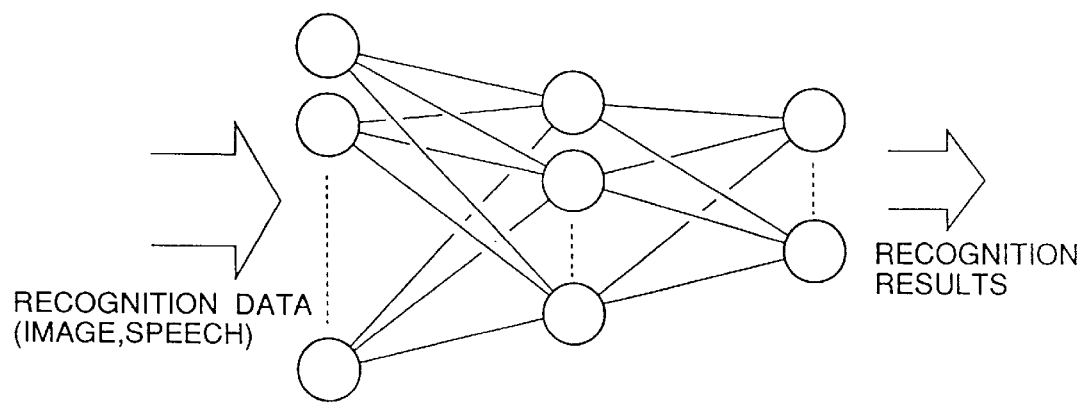
FIG. 8 is an illustration for assistance in explaining the learning with teacher-data type neural network architecture which constitutes the category-classified recognition apparatus.

FIG. 8 shows an architecture image of the respective neural network of the category recognizing apparatus 403 shown in FIG. 4. The input and output form is the same as the learning form of the ordinary hierarchical structure type neural network. The input data are the image data (the input units for all pixels can be prepared, or it is possible to compress the input information in some way), and the output data are the recognized results of the input data (the output units can be prepared for each recognition or classification item in the same way as the input, or it is possible to code the output information in some way). As the learning rules, it is possible to utilize a method referred to as back propagation method as disclosed in a document by Rumelhart (Nature, vol. 323. pp 533 to 536, 1986) or other related and improved methods.

As described above, when the learning data increase, the convergence speed of the learning with teacher-data by the hierarchical architecture type neural network is reduced markedly. Therefore, in order to appropriately decide the parameters (e.g., the number of network layers, the number of units for each layer, the initial values of the coupling weights thereof, etc.) for determining the convergence performance, a serious problem equivalent to the complicated non-linear optimization problem arises, so that it is difficult to obtain a practical convergence performance under practical loads. In the system of the present invention, however, since the categories are classified by the clustering processing of a plurality of stages, as far as the number of the learning data belonging to the respective finally classified categories is reduced sufficiently, the learning by the category recognizing apparatus 403 provided with the hierarchical architecture type neural network is securely converged, so that it has become possible to construct a recognizing system under a practical engineering load. Further, after the learning for all the categories has been completed by the category recognizing apparatus 403, the recognition system can be constructed completely.

Figure 9:
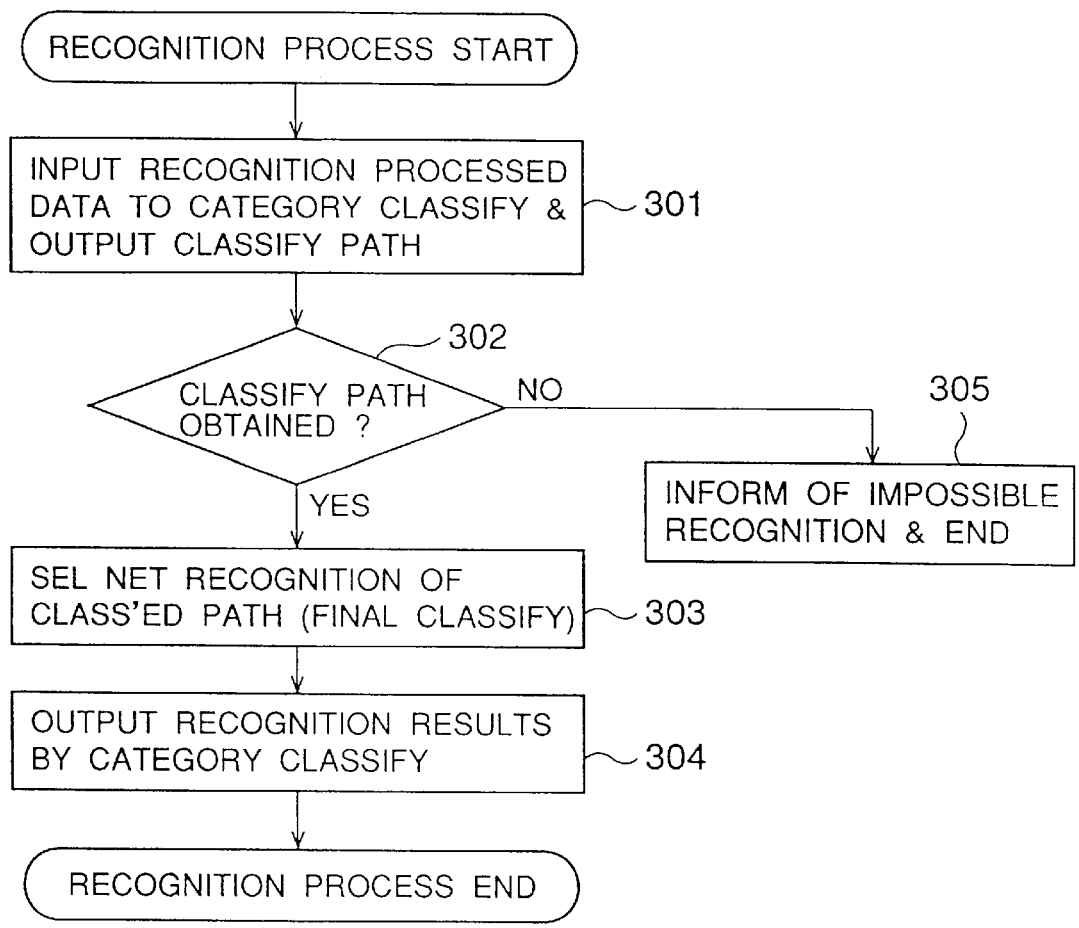
FIG. 9 is a flowchart for assistance in explaining the recognition processing of the apparatus shown in FIG. 4.

The recognition processing (as shown by the recognition processing flowchart in FIG. 9) of data which are not the learning data is roughly equivalent to the system construction procedure (from which the learning process is excluded). In more detail, in step 301, when the data to be recognized are inputted to the category-classifying-apparatus 401 as shown in FIG. 4, the category classifying apparatus 401 outputs the finally classified category of the given data and the data themselves to the recognizing neural network switching apparatus 402. Or else, the category classifying apparatus 401 outputs data indicative of absence of the consistent path to the neural network switching apparatus 402. Successively, in step 302, control checks whether there exist a consistent classification path in the category classifying apparatus 401. As the results, if it exists, control proceeds to step 303, in which the neural network switching apparatus 402 transmits the data to be recognized to the category recognizing apparatus 403 corresponding to the received final classified category. Further, in step 304, the category recognizing apparatus 403 outputs the finally recognized results. In step 302, when control determines that there exists no consistent classification path, a recognition disabling signal is monitored in step 305, ending the control processing.

A series of the above-mentioned recognition processing is small in computation burden. Therefore, when limited to only the recognizing processing, it is possible to realize a practical recognition system for large scale data by use of a computer (e.g., a personal computer) with a relatively small computing performance.

Further, in the information recognition system of the present invention as described above, it is possible to realize appropriate high-speed recognition and classification of large scale data groups, with the use of the recognition and classification system provided with the learning without teacher-data type neural network for executing category classification at a plurality of stages and with the learning with teacher-data type neural network for executing detailed recognition and classification.

Another modification of the information recognition system according to the present invention will be described hereinbelow.

First, in FIG. 10, when both a learning without teaching data type architecture and a learning with teaching-data type architecture are required for a plurality of neural network processing, the system for executing the practical processing must be provided with exclusive processing apparatuses corresponding to each architecture (i.e., a learning without teaching-data type network processing apparatus 801 and a learning with teaching-data type network processing apparatus 802). The individual neural network processing begins when a network managing apparatus 803 commands a network-switching-apparatus 806 to switch the processing operation to an individual processing apparatus provided with the network architecture required for the processing. In selection of a network, the network-managing-apparatus 803 further commands a processed-data-storing-apparatus 804 and a network-architecture-data-storing-apparatus 805 to transfer data to be processed and architecture data (connection weight data, etc.) of the network required for the processing, to a neural network processing apparatus (the learning without teaching data type network processing apparatus 801 or a learning with teaching-data type network processing apparatus 802). Owing to the transfer command, the processing data and the network coupling weight data are transferred to the neural network processing apparatuses 801 and 802 and the internal memory units 807 and 808 of the processing apparatuses, respectively. When the processing execution is enabled, the neural network processing apparatus 801 or 802 informs the network managing apparatus 803 of a completion of processing preparation. In response to an answer signal of processing execution start, the neural network processing apparatus executes predetermined processing, writes the execution results in the processed data storing apparatus 804, and transmits a processing end signal to the network managing apparatus 803, thus completing one neural network processing. By repeating the above-mentioned processing, it is possible to realize a great number of neural network processing with the use of the minimum number of exclusive network processing apparatuses which correspond to the number of the network architectures required for the processing.

The above description has been made in case of the processing by the deterministic networks. In the case where the neural network processing apparatuses 801 and 802 are provided with a function of learning, respectively, however, the processing data (the learning data in this case) are read for each learning-process in the same way as with the case of the above-mentioned processing. On the other hand, the initial values of the network architecture data (connection weight data) are read once at the processing start, and thereafter updated in the storage form in the respective memory unit (807 or 808) of the respective processing apparatus (801 or 802). After the processing end, the connection weight data are written in the network architecture data storing apparatus 805, instead of that the processing results are written in the processing data storing apparatus 804.

An embodiment of the information recognition system according to the present invention will be described hereinbelow, in which the recognition system is applied to a system for recognizing char-bed shapes within a recovery boiler furnace.

The recovery boiler is used in a paper-pulp plant. In the recovery boiler, organic constituents contained in a waste liquid (referred to as black liquor) produced in chip cooking (or digesting) process are burnt within a boiler to form vapor by the combustion heat. Further, costly chemicals (used for the cooking process) contained in the waste liquid is recovered by the utilization of the chemical reaction produced in the sediment (referred to as char-bed) of the dried waste liquid existing within the boiler. In the recovery boiler, since the operating condition changes markedly according to the characteristics of the black liquor or the progress of the chemical reaction, it is difficult to automate the operation of the recovery boiler perfectly, so that the recovery boiler has been so far operated by some expert operators who always monitor the furnace conditions. In this case, the operators judge the furnace conditions with reference to the shapes of the char-bed as shown in FIGS. 11A to 11E. Therefore, a system for automatically recognizing the char-bed shapes is indispensable for the automation of the recovery boiler system. In practice, however, the images displayed on monitors and watched by the operators are not limited to only clear images as shown in FIGS. 11A to 11E. Rather, in general, there are many cases where the outline of the char-bed mountain is not clear as shown in FIG. 11F or there exists the case where the dust-like substances are often attached to an edge of camera lenses for detecting the interior of the furnace.

In case of the image processing such that the ordinary edge detection processing and the binary processing are executed in order to obtain the char-bed contour information from the original images, the processed images include many images of the dust attached to the edges in the camera visual field or caused by background noise within the furnace. Therefore, in case of the conventional image recognition technique, it is extremely difficult to realize a stable recognition free from a serious error, which has been so far executed by expert operators (who operate the boiler unconsciously very well).

Therefore, in order to realize as a robust and stable recognition function as a human operators, that is, in order to realize a stable recognition according to various changes in the furnace combustion conditions (caused by changes in various operating points), it is necessary to learn large number of image data set, which may amount to several hundred data at the learning stage. Accordingly, it is required to incorporate various classification processing with the use of many learning without teaching-data type networks and many learning with teaching-data type networks to realize the architecture of the recognition system as described above.

Figure 12:
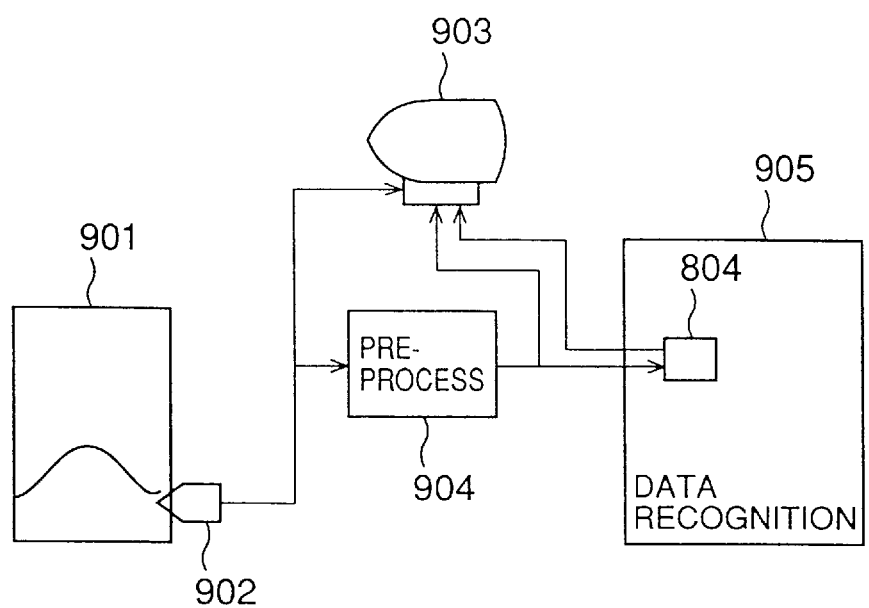
FIG. 12 is a block diagram showing a system architecture, in which the system shown in FIG. 10 is applied to the char bed shape recognition processing in a recovery boiler plant.

FIG. 12 shows an example of the system architecture for realizing the char-bed recognition as described above.

In more detail, the char-bed image acquired by a furnace camera 902 for detecting the inside of a recovery boiler 901 is pre-processed (i.e., noise reduction, etc.) by a pre-processing apparatus 904, and then transmitted to a processed data storing apparatus 804 (which corresponds to the processing data storing apparatus 804 shown in FIG. 10) of a data recognition apparatus 905 (which corresponds to the system shown in FIG. 10). In the data recognition apparatus 905, as already explained, the respective processing boards of the learning without teaching-data type neural networks and the learning with teaching-data type neural networks are switched in use in order to execute data recognition by combinations of a plurality of neural network processing. Further, in the same way as with the case of the character recognition, it is also possible to increase the recognition capability by combinations of the conventional methods. The final recognition results are transmitted, together with the original image and the pre-processed image, to a monitoring apparatus 903 as monitoring information and to terminal control loops (not shown) as control reference command. The architecture of the data recognition system 905 will be described in further detail hereinbelow.

Figure 13:
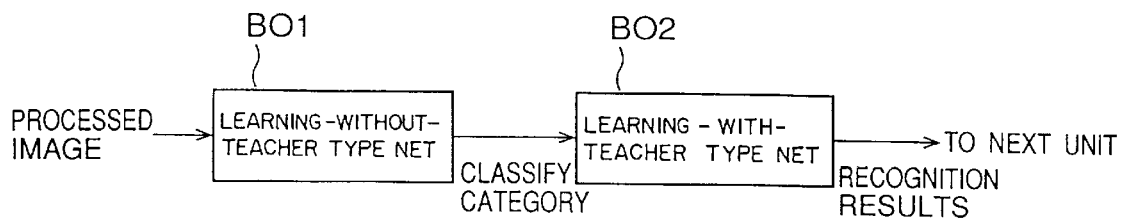
FIG. 13 is a block diagram showing a practical construction of the information recognition system adopted as a core section of the system shown in FIG. 12.
Figure 14:
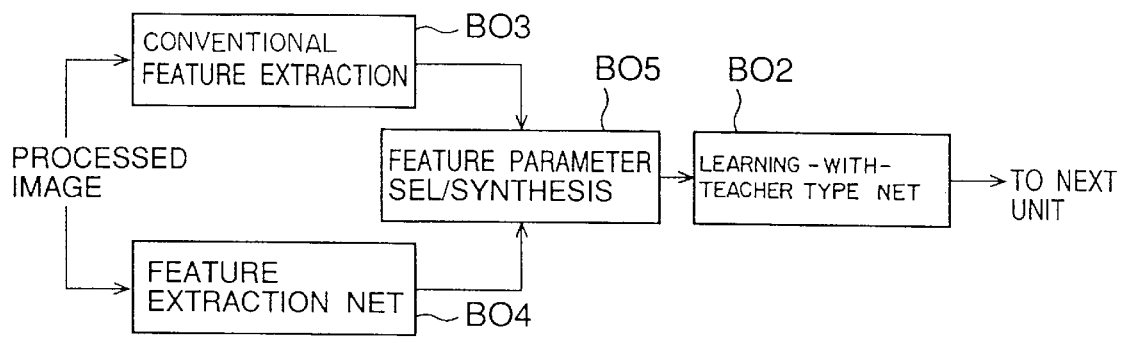
FIG. 14 is a block diagram showing another practical construction of the recognition system adopted as a core section of the system shown in FIG. 12.
Figure 15:
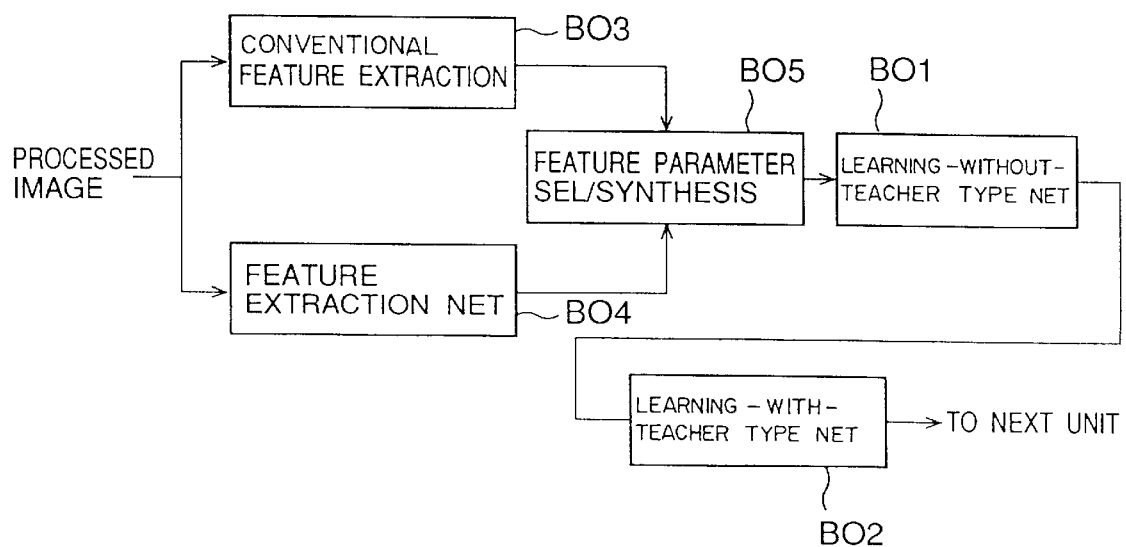
FIG. 15 is a block diagram showing the other practical configuration of the information recognition system adopted as a core section of the system shown in FIG. 12.

FIGS. 13 to 15 show some architecture examples of the large scale data recognition systems 905.

In the recognition system, shown in FIG. 13, a learning without teaching-data network B01 first executes a rough category classification, and thereafter a learning with teaching-data network B02 outputs the final recognition result on the basis of the category classified data, to which the system shown in FIG. 4 is applied.

Figure 16:
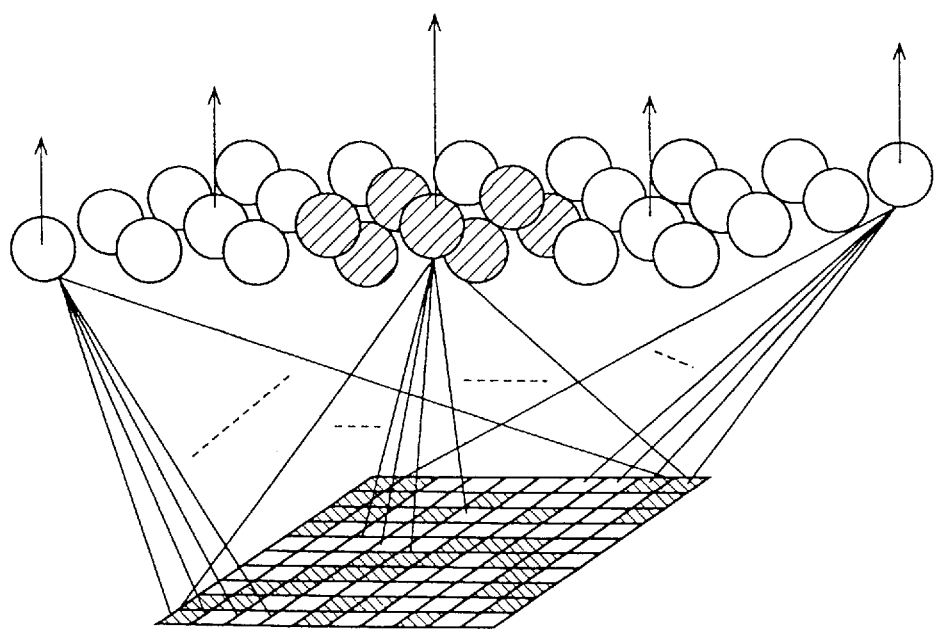
FIG. 16 is an illustration showing a processing image of the recognition operation of the learning without teacher-data type neural network.

FIG. 16 shows a processing image of the learning without teaching-data type network B01. In case of the learning without teaching-data type network, basically each unit receives all the outputs of an image to be processed, internally processes the received image data, and learns in such a way as to form a category of the inputted image data, with the units for outputting the largest values as its center (the shaded units in FIG. 16 imply the central units of the category).

Figure 17:
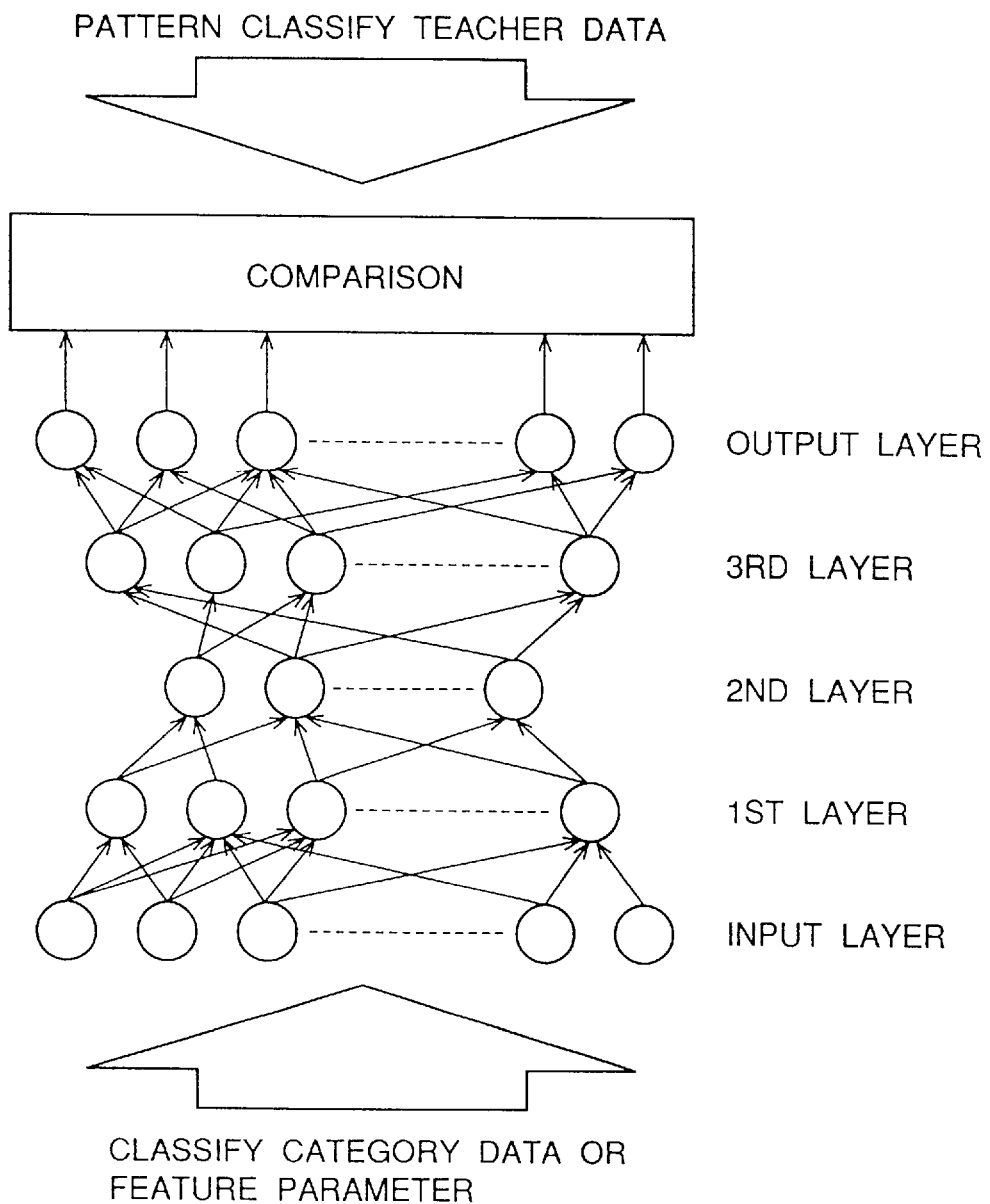
FIG. 17 is an illustration showing a processing image of the recognition operation of the learning with teacher-data type neural network.

After having learned the sufficient image to be processed, the learning without teaching-data type neural network B01 can output the classified category of the newly presented image data to be processed. In order to associate these data with symbolic recognition, the learning with teaching-data type neural network B02 is prepared for succeeding processing. FIG. 17 shows the processing image of the learning with teaching-data type neural network B02. In FIG. 17, the data outputted by the respective units of the output layer are compared with the pattern classification teacher data, and the learning is executed so that the difference between the two can be reduced to zero.

The category classification by the learning without teacher-data type neural network B02 is a rough and preliminary classification in a certain sense. For executing further definite information compression, an architecture as shown in FIG. 14 is used, in which functional modules for extracting features are additionally incorporated. In this case, when a conventional feature extracting apparatus B03 is adoptable, it is possible to incorporate the conventional apparatus with the system.

Figure 18:
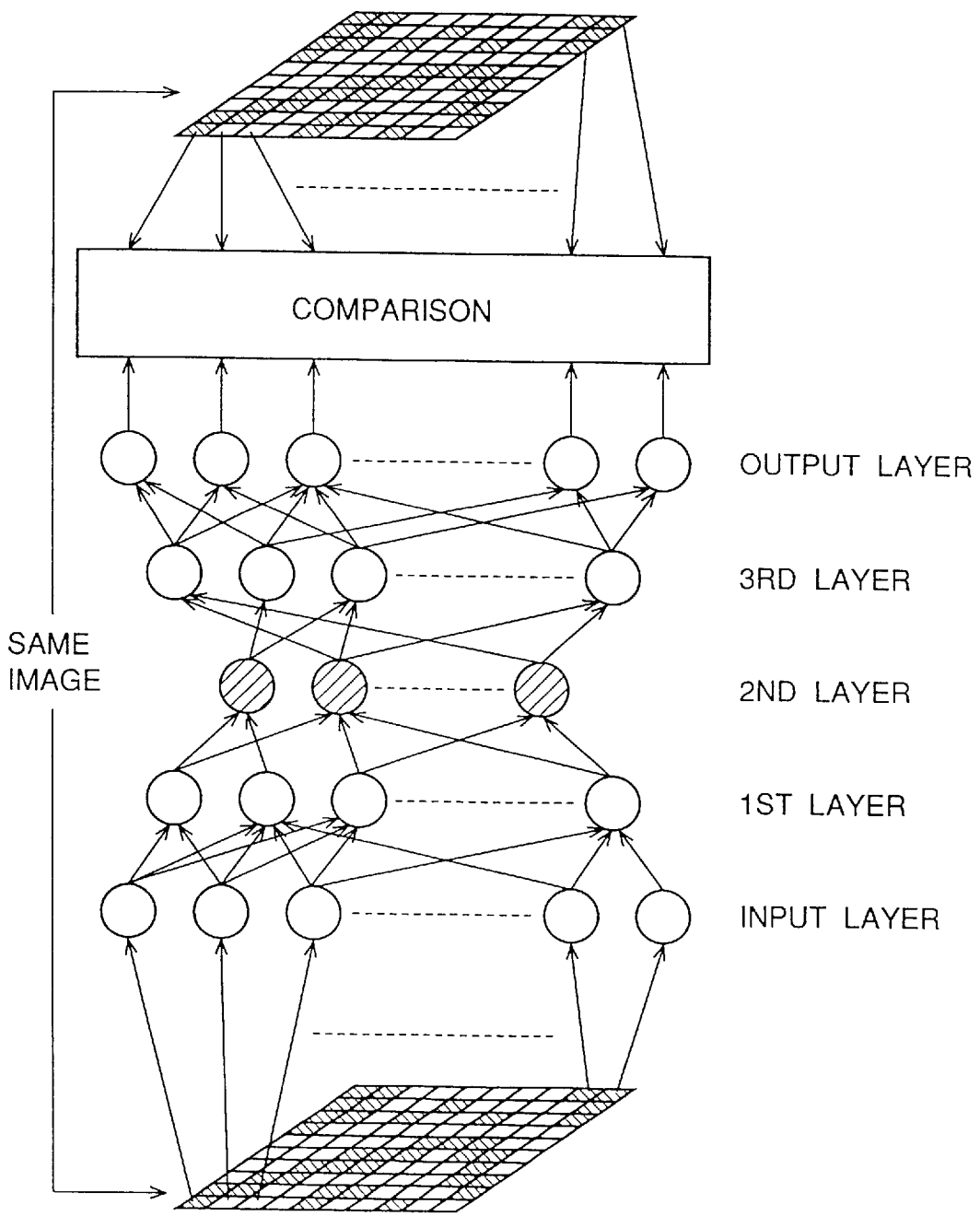
FIG. 18 is an illustration showing a processing image of the learning operation of the learning with teacher-data type neural network.

FIG. 18 shows a processing image obtained when the feature extracting network B04 is incorporated. In this network, the number of the units of the input layer is equal to that of the output layer. Further, the following relationship can be established: The number of units of the input layer is much greater than the number of units of the second intermediate layer (the number of units in the central layer, in general). Since the network learns so as to output the same data as the input image, the network is substantially the same as the ordinary learning with teaching-data type network. The output pattern of the central intermediate layer (the second intermediate layer in FIG. 18) obtained after the learning includes sufficient information for reproducing the input image at the network output layer. Therefore, it is possible to interpret that the output pattern thereof is a signal vector indicative of a feature variable. Accordingly, the network constructed by the three layers (the input layer and the first and second intermediate layers) of the first half of the network can be used as the feature extracting network B04 after learning. Further, the final feature parameters obtained by a feature parameter select and synthesis unit B05 are given to the learning with teaching-data type neural network B02 as the final recognition results, together with the other feature parameters when the conventional feature extracting methods can be utilized.

Further, when the obtained feature variable data are redundant, it is possible to construct the system such that a learning without teaching-data type network B01 for executing the category classification is further incorporated with the system as a functional block,a s shown in FIG. 15.

Further, as a system architecture which is further expanded beyond those shown in FIGS. 14 and 15, it is of course possible to assemble a further great number of teacher-absent and learning with teaching-data type neural networks for executing further detailed and fine functional classification and recognition. In this case, it is possible to realize the recognition system in a practical level with the use of a small number of hardware resources, as far as the above-mentioned architecture of the large scale data classification and recognition system can be adopted.

In the system (as shown in FIG. 10) used as the system for recognizing the char-bed shape within the recovery boiler furnace, it is possible to construct apparently a multifunction large scale neural network by use of a small number of hardware resources and by switching network information required for one network hardware. In this case, it is possible to realize a single chip system.

Figure 19:
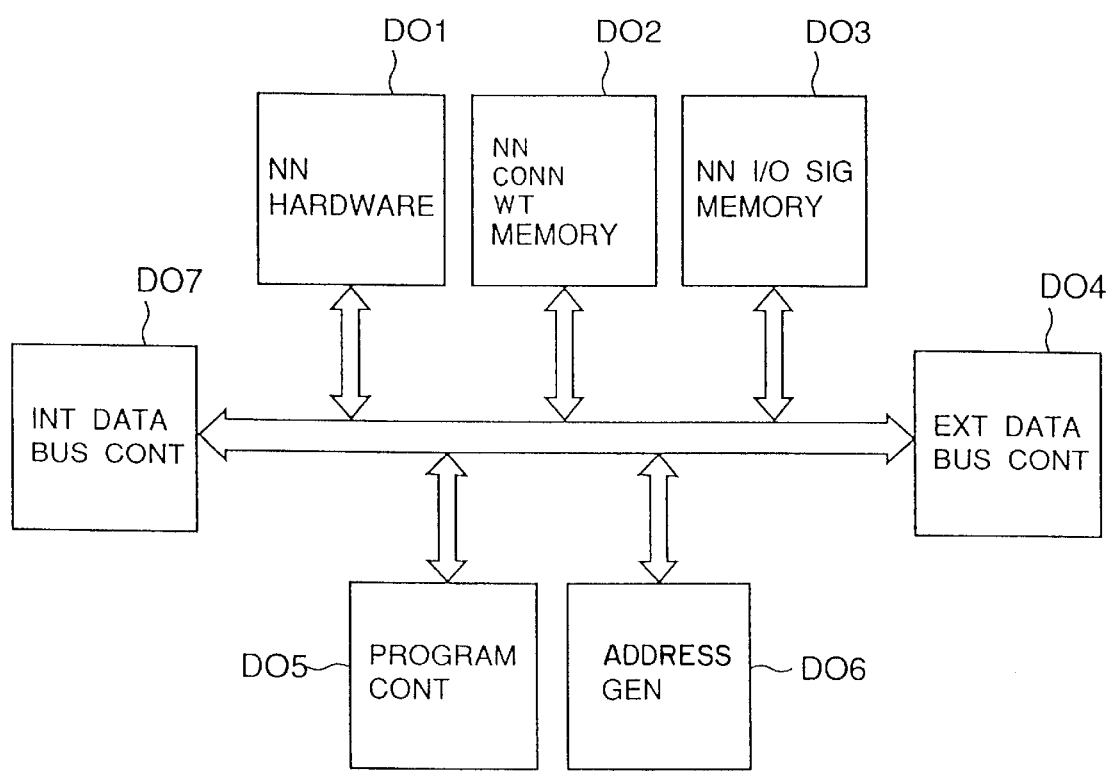
FIG. 19 is a block diagram showing an example of the hardware construction of the system shown in FIG. 10.

FIG. 19 is a block diagram showing an example of the above-mentioned hardware construction.

First, in FIG. 19, a neural network hardware element D01 includes an arithmetic circuit, RAM, ROM, etc. for implementing the basic computations as a neural network element. The neural network hardware element D01 is connected to a neural network connection weight memory D02 and a neural network element input/output signal memory D03 through an internal data bus, in order to transfer connection weight data between the respective neural network elements and input/output signal data of the respective neural network elements. The neural network connection weight D02 saves the transferred connection weights between the respective neural network elements, and the neural network element input/output signal memory D03 saves the transferred input/output signal data of the respective neural network elements. The data transfer among the neural network hardware element D01, the neural network connection weight memory D02, and the neural network element input/output signal memory D03 is controlled by an internal data bus controller D07. Further, the data transfer between the neural network elements and the external devices is controlled by an external data bus controller D04. Since the internal data bus controller D07 controls the data transfer between the neural network hardware element D01 and the memories D02 and D03, it is possible to improve the data transfer speed. A program controller D05 sets the software and executes the sequence control in accordance with the software, when one neural network hardware element D01 is used as a plurality of neural network elements. Further, an address generating section D06 generates addresses of the data to be written in the neural network hardware element D01 and the memories D02 and D03 in accordance with the instruction of the program controller D05.

Figure 20:
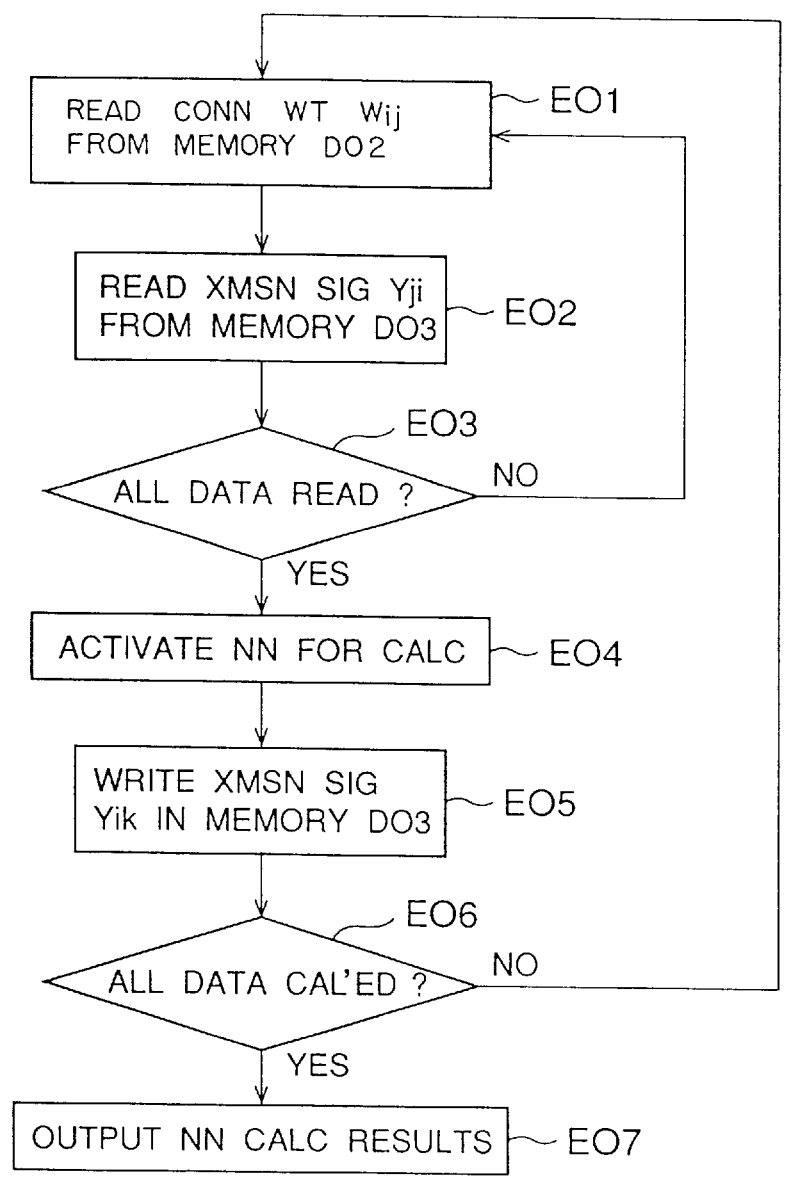
FIG. 20 is a flowchart for assistance in explaining the forward-direction propagation control algorithm of the system shown in FIG. 19.
Figure 21:
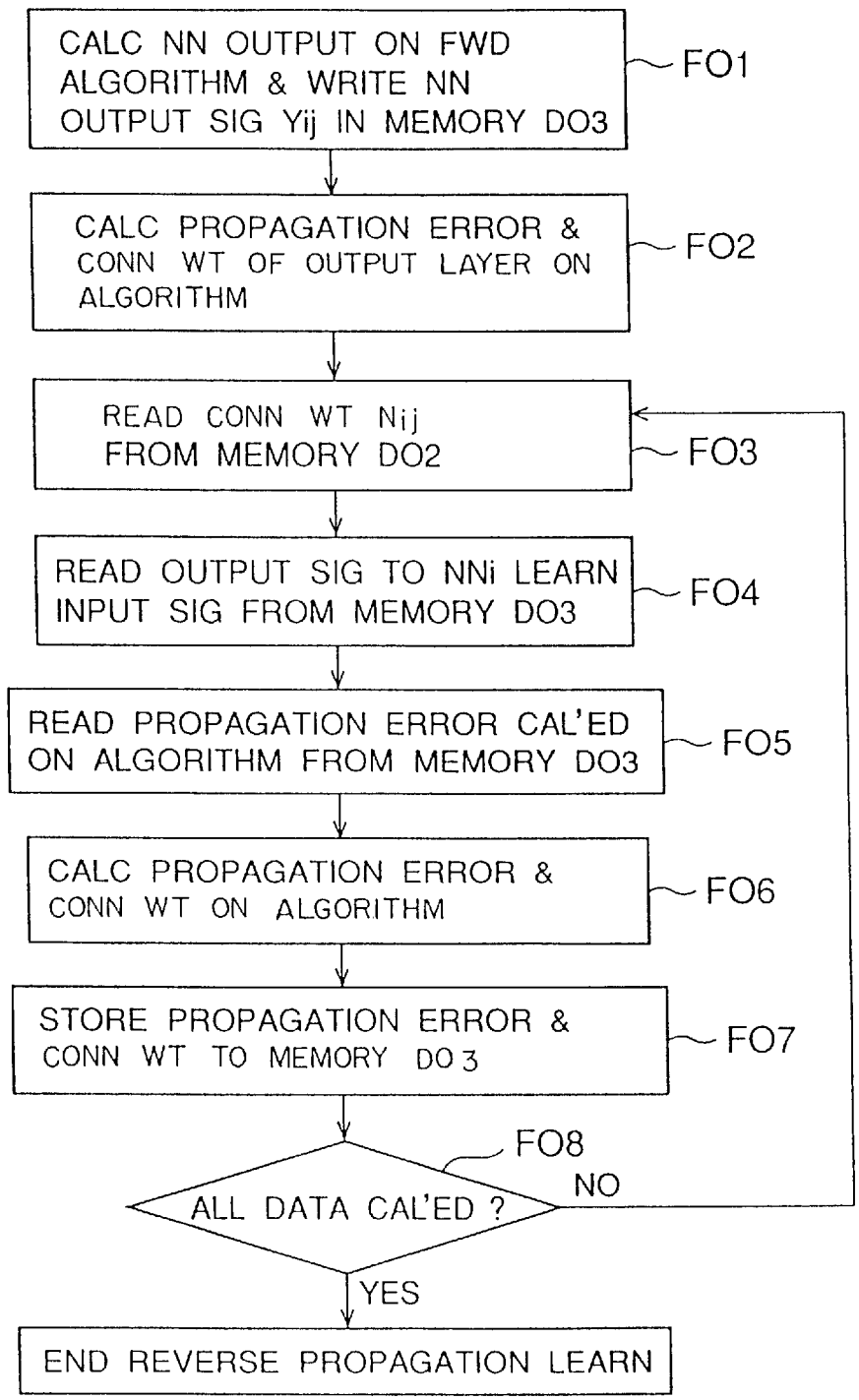
FIG. 21 is a flowchart for assistance in explaining the reverse-direction propagation control algorithm of system shown in FIG. 19.

The learning processing of this neural network chip can be executed in accordance with a forward direction propagation algorithm shown in FIG. 20 and a reverse direction propagation algorithm shown in FIG. 21, and these algorithms are executed under control of the program controller D05 shown in FIG. 19.

First, with reference to the forward direction propagation control algorithm shown in FIG. 20, in step E01, control reads all the connection weights $W_{ij}$ connected to the inputs of the neural network element i from the memory D02, where i denotes each neural network element realized by software when a single neural network element D01 is used as a plurality of neural network elements in the form of software. In step E01, therefore, the connection weights $W_{ij}$ of a single neural network element i are read from the memory D02. Successively, in step E02, $Y_{ji}$ (transmission signals) from the neural network element i to the neural network element j are read from the memory D03. Further, it has been confirmed that all the data necessary for the computing of neural network element i's output are read from the memories D02 and D03 to the neural network hardware element D01 in step E03. The neural network hardware element D01 is operated for computation to obtain the computation results in step E04. In step E05, the obtained computation results are written in the memory D03 as the transmission signals $Y_{ik}$ to be transmitted from the neural network element i to another neural network element k when considered in the form of software. After computations have been executed for all the neural network elements i, k, . . . , the output values of the final neural network can be obtained.

After the learning data have been propagated in the forward direction, the error reverse direction propagation is executed by calculating the connection weights between the respective neural network elements on the basis of an error between the neural network output value and the criterion output. Refer to COMPUTROL, No. 24 pp 53 to 60 for further detail of the practical computation algorithm.

Here, with reference to the reverse direction propagation control algorithm shown in FIG. 21, first the step F01 includes the algorithm shown in FIG. 20. Therefore, in this step, the output of the neural network is calculated in accordance with the forward direction propagation control algorithm on the basis of leaning data and in accordance with the forward direction propagation. Thereafter, the reverse direction propagation learning starts. First, in step F02, the propagation error to the preceding intermediate layer between two output layers and the updated connection weights are calculated, on the basis of the error between the output signal and the criterion output of the neutral network and the connection weights to the output layers (stored in the memory D02) and in accordance with the error reverse propagation algorithm. Further, the connection weights are updated in the order from the output layer to the input layer. That is, in step F03, the connection weight $W_{ij}$ from the neural network element j and the neural network element i to which the output of the neural network i is inputted is read from the memory D02. Further, in step F04, the output values of the learning data of the neural network element i are read from the memory D03 to the neural network hardware element D01. Further, in step F05, the propagation errors calculated in order from the output layer are read from the memory D03. Thereafter, in step F06, the succeeding error propagating in the intermediate layer and the updated connection weights $W_{ij}$ are calculated in accordance with the error reverse direction propagation algorithm. Further, in step F07, the calculated propagation error and the connection weights are stored in the memory D03 for data update. Thereafter, in step F08, control checks whether all the calculations of all the neural network elements have been completed from the software standpoint. The above-mentioned steps F03 to F07 are repeated until the result of 'YES' can be obtained.

As described above, in case of a single-chip neural network system, since a large scale neural network system can be constructed without increasing the number of neural network hardware elements and since the space required for the neural network system and the number of the connection wires can be reduced, the reliability of the neural network system can be improved. Further, since the data can be transferred between the neural network hardware elements and the neural network storing RAM through the internal bus constructed within the same chip, the data can be transferred at high speed, so that it is possible to shorten the calculation time required for the neural network system. In addition, since these elements can be constructed on the same chip, it is possible to improve the reliability of the hardware elements.

As described above, in the information recognition system according to the present invention, it is possible to realize the information recognition system which can acquire a great number of recognition rules automatically through the processing of learning data (these have been not so far realized). Further, the number of iterative calculations required for acquiring rules can be reduced down to a practical number. In addition, since each neural network unit can be composed of about several tens of neurons in general, the number of the network connection circuits can be reduced down to a realizable number. Further, since the network connection circuits between the units can be composed of the input and output signal lines between the respective units, the number of the circuits is realizable. Therefore, it is possible to solve the problem that the number of the connection circuits increases drastically, which has been so far involved in the conventional large scale neural network system.

Further, in the case where the category classification by the clustering processing is executed at a plurality of stages, as far as the number of learning data belonging to the finally classified categories is sufficiently reduced, it is possible to roughly secure the convergence of the learning by use of the category classification recognition system provided with a hierarchical neural network architecture. Therefore, it is possible to construct the recognition system under the practical engineering load and further to realize appropriate high-speed recognition and classification for a large scale data group.

Further, based on the conception such that a limited number of network hardware resources can be used as a great number of networks by switching data inputted to the network hardware resources, the processing executed by a great number of neural networks can be realized by a minimum possible number of practical processors, thus allowing the large scale data recognition to be applicable to various fields in practice. Further, in case of a single-chip neural network system, since a large scale neural network system can be realized without increasing the number of neural network hardware elements, the space required for the neural network system and the number of the connection wires can be reduced. Accordingly, the reliability of the neural network system can be improved. Further, since the data can be transferred between the neural network hardware elements and the neural network storing RAM through the internal bus constructed within the same chip, the data can be transferred at high speed, so that it is possible to shorten the calculation time required for the neural network system. In addition, since these elements can be constructed on the same chip, it is possible to improve the reliability of the hardware elements.

Figure 22:
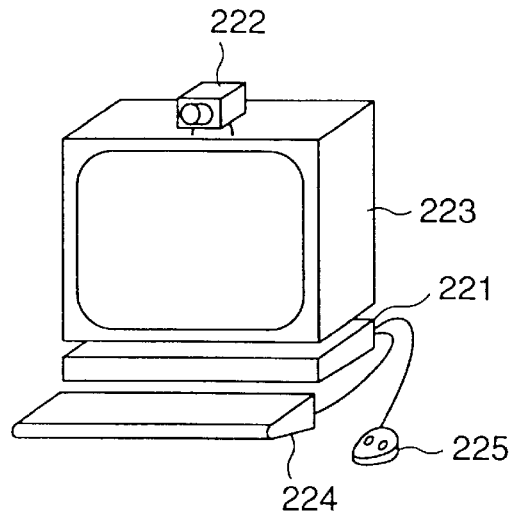
FIG. 22 is an outside view showing a first embodiment of the man-machine interface system according to the present invention.
Figure 23:
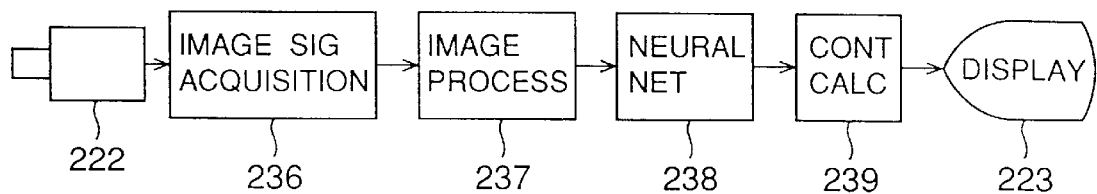
FIG. 23 is a block diagram showing the system shown in FIG. 22.
Figure 24:
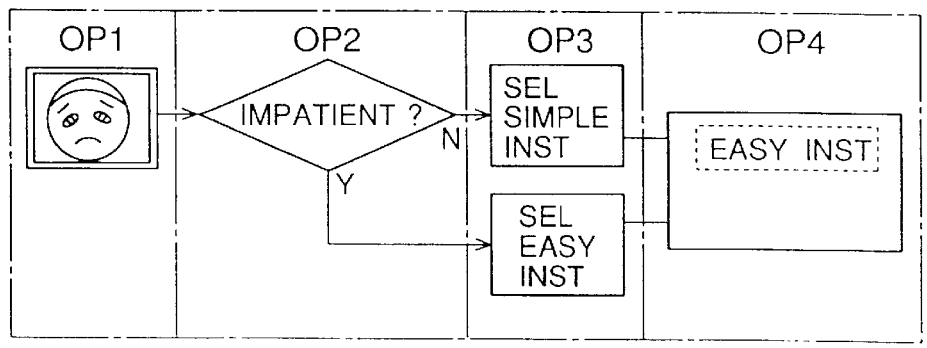
FIG. 24 is an illustration for assistance in explaining the operation of the system shown in FIG. 22.

FIGS. 22 to 24 show a first embodiment of a man-machine interface system (a control system) using the large scale information recognition system according to the present invention.

In FIG. 22, a microcomputer body 221 includes a CPU, a ROM for storing operation programs and data, a RAM, an image memory, interfaces, etc., in addition to an image signal acquiring board (described later), an image processing board, a neural network board, a control signal calculation board, etc. Further, a TV camera 222, a display 223, a key board 224, a mouse 225, etc. are connected to the microcomputer 221. On layout of this system, the display 223 is mounted on the computer 221, and the TV camera 222 is mounted at the central portion on the upper surface of the display 223.

In the layout as described above, the camera 222 takes an image of an operator (his whole face, in particular), and transmits the image signals to the computer 221. The computer 221 converts the transmitted analog image signals to digital image signals, and recognizes the feeling of the operator on the basis of the converted digital data. Further, on the basis of the recognized operator's feeling, the computer 221 extracts an operating instruction most appropriate to the current feeling of the operator from a plurality of operation instructions previously stored in the ROM, and displays the extracted instruction on the display 223. With reference to the displayed instruction, the operator can proceed-with his procedure by use of the keyboard 224 and the mouse 225.

FIG. 23 is a block diagram showing the man-machine interface system as described above, and FIG. 24 is a flowchart showing an example of the operation thereof.

The system shown in FIG. 23 comprises the TV camera 222, the display 223, the image signal acquiring board 236, the image processing board 237, the neural network board 238, and the control arithmetic board 239.

The image signals taken by the TV camera 222 are A/D converted by the image signal acquiring board 236, and then inputted to the image processing board 237. The image processing board 237 stores the inputted data once in the memory and then extracts only necessary image data on the basis of other data in the memory. In FIG. 24, an illustration OP1 shows an uneasy feeling of the operator which can be understood on the basis of the shapes of his eyes, eyebrows and mouth. Therefore, the image processing board 237 first executes the edge detection to extract the shapes of the eyes, eyebrows and mouth (which provide key points related to the operator's facial expression).

The image data extracted by the image processing board 237 are transmitted to the neural network board 238. Since the neural network constructed as shown in FIGS. 1A and 1B has already learned how to recognize the operator's facial expression and feeling on the basis of the given image data, the neural network board 238 recognizes the operator's facial expression on the basis of the image data transmitted by the image processing board 237, and outputs the recognized results. When the operator's eyes, eyebrows and mouth express an uneasy facial expression as show by OP1 in FIG. 24, the expression is discriminated and "impatient" (YES) is determined in OP2 in FIG. 24.

In this case, the control signal calculation board 239 extracts an appropriate operating instruction from the memory in accordance with the output of the neural network board 238 as shown by OP3 in FIG. 24 and displays the extracted instruction. In more detail, if YES in OP2, an easy instruction for non-skilled operators is selected, and if NO in OP2, a simple instruction for skilled operators is selected in OP3. The selected instruction is displayed on the display 223 in OP4.

As described above, since the above-mentioned operation is executed at all times, it is possible to select an appropriate operating instruction according to the change in the facial expression of the operator.

Further, in the above-mentioned system, although the operator's eye, eyebrows and mouth have been detected, it is also possible to detect the perspiration on the operator's face in order to effectively discriminate the degree of the irritation of the operator. Further, when the wrinkles are detected, it is possible to effectively detect the feeling of elderly men usually not skilled in the system of this sort. In addition, it is also possible to use a speech output apparatus to give a timely advice to the non-skilled operator.

Further, in the above-mentioned system, although the image processing board 237 executes the edge detections to extract the facial expression factors such as the eyes, eyebrows and mouth, it is also preferable to use the neural network to extract the facial expression factors.

Here, the case is taken into account where neural network as shown in FIG. 1A extracts the operator's eyes, eyebrows and mouth on the basis of the whole image of an operator face, by way of example. The roles are allocated to the respective units NN, for instance as follows: the neural network unit $NN_{11}$ extracts eyes from the whole face picture; $NN_{21}$ corrects the positions and sizes of the extracted eyes in accordance with the recognition rules; $NN_{31}$ detects a tense eye pattern; $NN_{,2}$ extracts eyebrows from the whole face picture; $NN_{22}$ corrects the positions and sizes of the extracted eyebrows in accordance with the recognition rules; $NN_{32}$ detects a tense eyebrow pattern; $NN_{13}$ extracts a mouth from the whole face picture; $NN_{23}$ corrects the positions and sizes of the extracted mouth in accordance with the recognition rules; $NN_{33}$ detects a tense mouth pattern, respectively.

In this case, the image data representative of the whole face are given as the learning input image data for the unit $NN_{11}$, and the data indicative of the eyes are given as the teaching data. Further, every possible patterns are given and learned until the image signal output can extract the eyes. By the above-mentioned learning, the unit $NN_{11}$ connotes the overall feature detecting capability including the eye shape and the positional relationship between the eye shape and the other parts in the face, so that it is possible to specify the eyes from the whole face image, in the same way as with the case where a man can judge the presence of the eyes by seeing the man face.

As the learning input image data of the unit $NN_{21}$, various patterns indicative of eyes of various sizes existing at various positions (i.e., various patterns expected to be outputted by the unit $NN_{11}$, when the system is used in practice) are given. As the teacher data, the patterns corresponding thereto and further corrected in position and size are given. The learning is repeated on the basis of the given learning and teacher data. Accordingly, the unit $NN_{21}$ can soon output an eye pattern obtained by correcting the eyes of various sizes existing at various positions to the eyes of a constant size existing constant positions.

The various eye patterns of various shapes of a determined eye size existing predetermined positions (i.e., various patterns predicted to be outputted by the unit $NN_{21}$) are given as the learning data of the unit $NN_{31}$, and the data indicative of whether the corresponding pattern is a tense pattern ((1) Positive) or not ((0) Negative) are given as the teacher data. The learning is repeated until the answer of (1) or (0) can be obtained at a constant rate (i.e., until a correct answer can be obtained except the case where it is difficult to discriminate whether the eyes indicate tense feeling or not when seen by a man).

The same as above is applied to the case of the eyebrows and mouth. In summary, the image data (learning input image data) indicative of the whole face and the image data (teacher data) indicative of the eyebrows are given to the unit $NN_{12}$. Further, the eyebrow patterns (learning input image data) of various sizes existing at various positions and the eyebrow patterns (teacher data) of a predetermined size existing at predetermined positions are given to the unit $NN_{22}$. Further, the various eyebrow patterns (learning input image data) of various shapes of a predetermined size existing at predetermined positions and the data indicative of whether the corresponding patterns is a tense pattern ((1) Positive) or not ((0) Negative) are given to the unit $NN_{32}$ for respective learning.

In the same way, the image data (learning input image data) representative of the whole face and the image data (teacher data) indicative of the mouth are given to the unit $NN_{13}$. Further, the mouth patterns (learning input image data) of various sizes existing at various positions and the mouth patterns (teacher data) of a predetermined size existing at a predetermined position are given to the unit $NN_{23}$. Further, the various mouth patterns (learning image data) of various shapes of a predetermined size existing at a predetermined position and the data indicative of whether the corresponding patterns is a tense pattern ((1) Positive) or not ((0) Negative) are given to the unit $NN_{33}$ for respective learning.

Further, after the respective learning have been converged, the respective change-over switches SW are set to the b side. In the practical use, it is possible to obtain a final decision owing to the linked functions of the respective units.

Here, it is also possible to consider that the system can be constructed by the neural network by allowing a large scale neural network to learn data, without depending upon the combination with a number of the above-mentioned small units. In this case, although the system itself can be constructed, since the factors to be learned becomes huge, the learning operation is complicated, so that it takes a long time to converge the learning operation and thereby the scale thereof is limited.

In contrast with this, when the small units are combined with each other, since the learning operation can be converged for each unit, it is possible to execute the learning effectively in short time. In addition, when all the units are learned in parallel to each other, even if the scale increases, the learning time is not increased, so that the system is not subjected to the limitation of the scale in this sense.

Therefore, in the above-mentioned embodiment, although the neural network composed of nine units as shown in FIG. 1A has been explained, it is of course possible to construct a further larger scale neural network, without being limited only to the system shown in FIG. 1A.

Further, there exists another problem with respect to the person skilled in computer operation to some extent. The problem is related to the operation of inputting data to the machine through the display picture, in particular with the use of a pointing device. As the pointing devices, a touch pen, mouse, etc. are so far known. In these pointing devices, a pointer is shifted by the operator's hand, so that a relatively large operation is required for the operator whenever the pointer is required to be moved. For instance, when a cursor on a display picture is moved with the use of a mouse, the operator must first takes a mouse with his hand, moves the mouse on a predetermined place (a mouse pad, a desk, etc.), and then clicks the button on when the cursor is located. In these operations, since some operation steps are required, there exists the case where the cursor cannot be placed to any desired positions along a considered locus, thus causing a vicious cycle of irritation and erroneous operation, in spite of the fact that a quick operation is required for the operator.

In the above-mentioned embodiment, although the neural network is adopted, another object is to extract the visual information of the operator on the basis of the image signals and further to control the pointer device on the basis of the extracted visual data.

Figure 25:
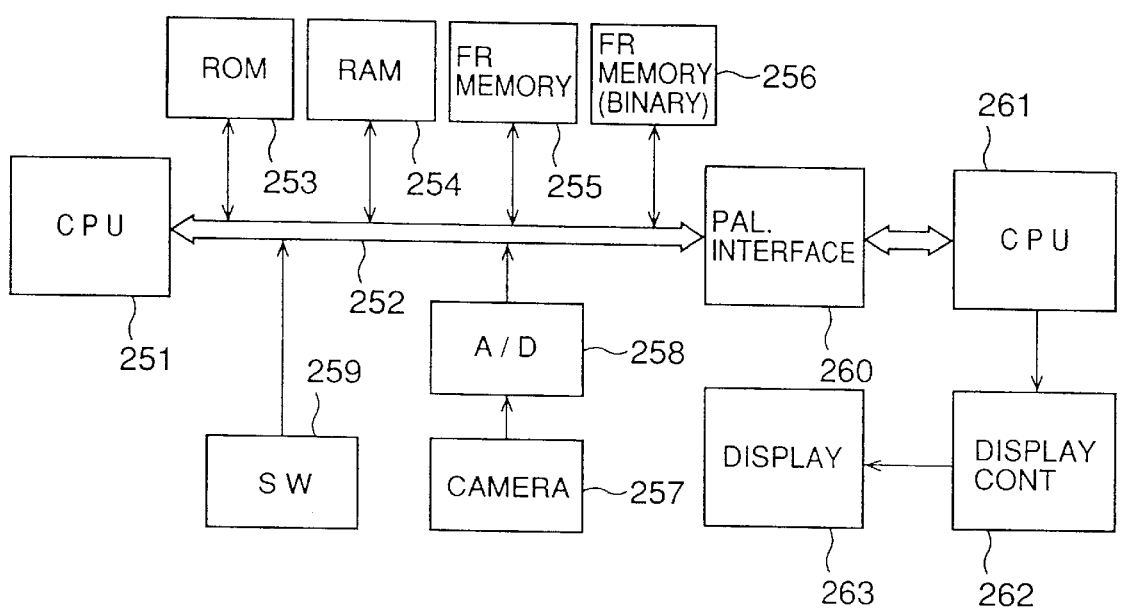
FIG. 25 is a block diagram showing the hardware construction of a pointing device system as a second embodiment of the man-machine interface system according to the present invention.
Figure 26:
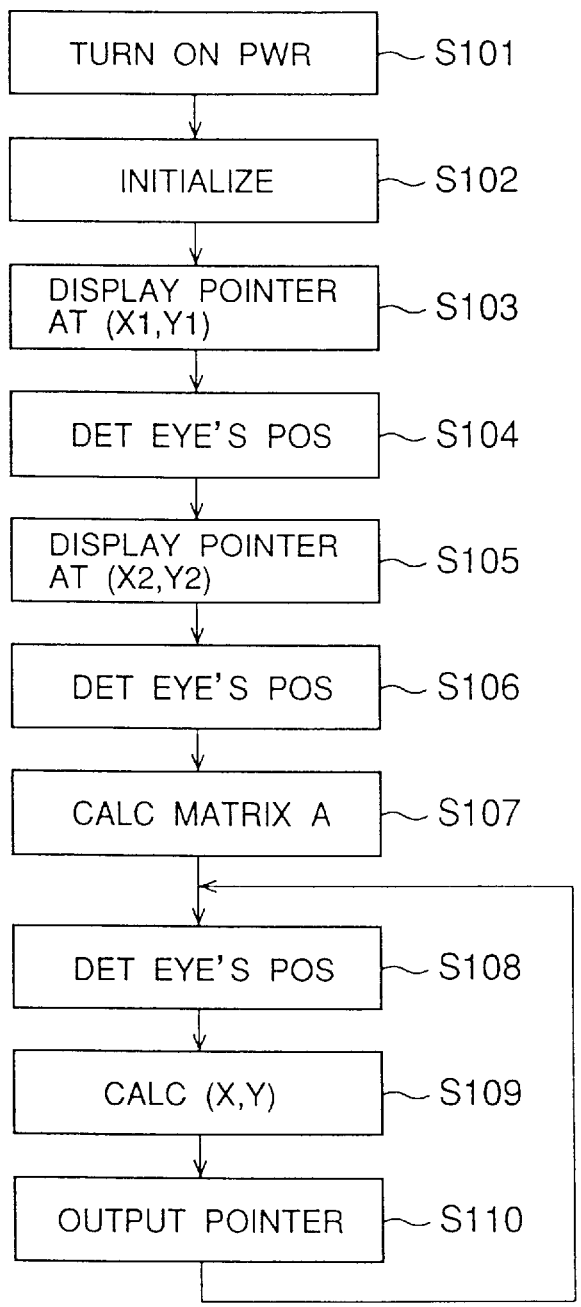
FIG. 26 is a flowchart for assistance in explaining the pointer control processing of the system shown in FIG. 25.
Figure 27:
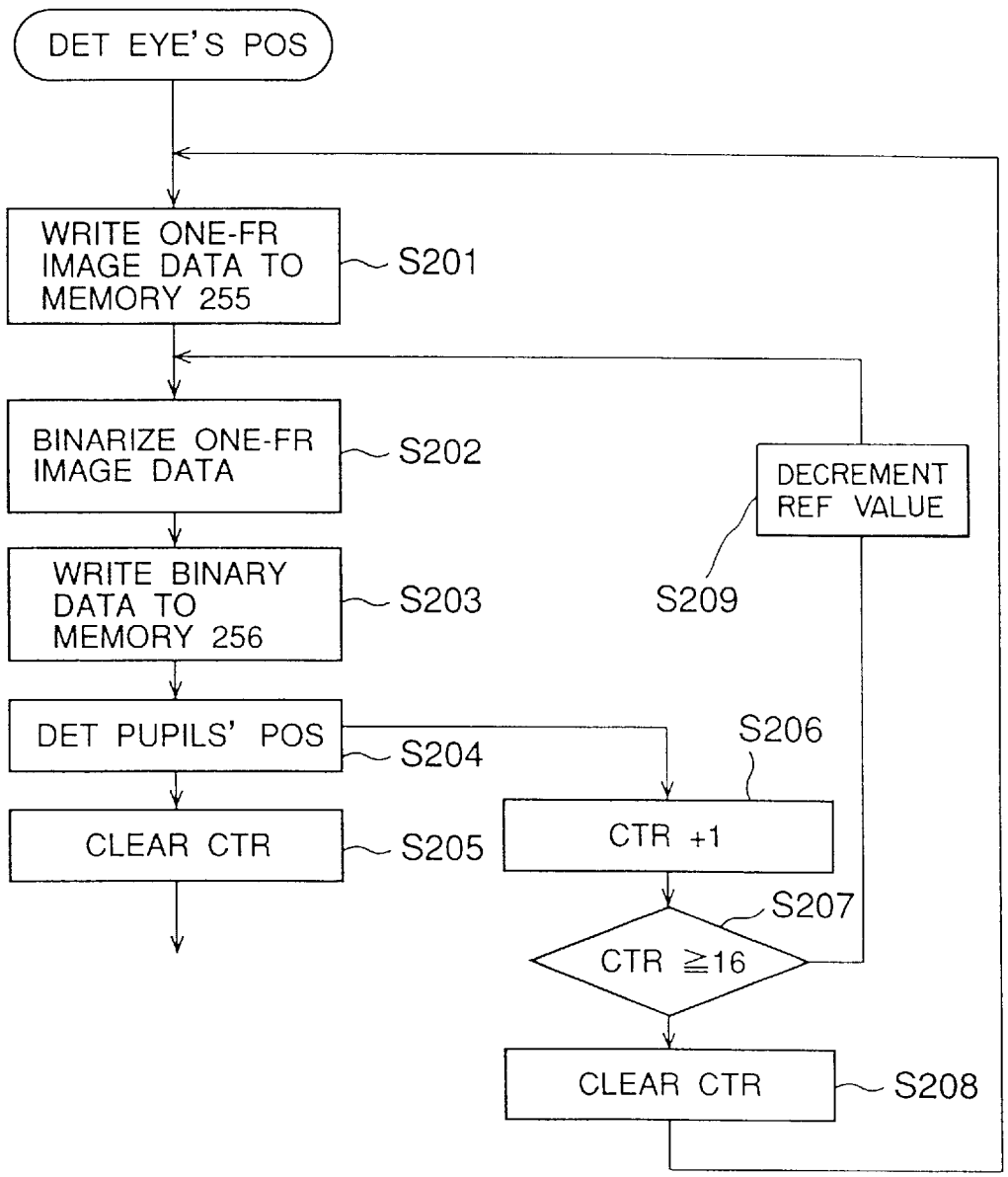
FIG. 27 is a flowchart for assistance in explaining the detailed eye position detecting processing shown in FIG. 26.

FIGS. 25 to 27 show a second embodiment of the man-machine interface system according to the present invention.

FIG. 25 is a block diagram showing the hardware construction thereof. The man-machine interface system shown in FIG. 25 can be divided roughly into a system for processing the image recognition and a system for processing the display. The image recognition processing system comprises a CPU 251, a bus 252, a ROM 253, a RAM 254, two frame memories (RAM) 255 and 256, a TV camera 257, an A/D converter 258, a switch 259, and a parallel interface 261. The display processing system is composed of a CPU 261, a display controller 262 and a display 263.

The CPU 251 controls various operation in accordance with programs and data stored in the ROM 253. The RAM 254 is used for various purposes such as buffers, registers for displaying statuses, etc. in the control operation. Therefore, the current position of the pointer is stored in the RAM 254.

The TV camera 257 is disposed on the upper portion of the display 263, in the same way as with the case of the first embodiment of the man-machine interface system, to take an image of the upper half of the operator so that at least the whole operator's face can be image sensed. The A/D convertor 258 converts the analog image signals transmitted from the TV camera 257 to digital image signals of 4 bits (16 gradations) per pixel, for instance in accordance with the control of the CPU 251. The digital image signals for one frame are stored in the RAM 255. The CPU 251 binarizes (described later) the data stored in the RAM 255 and stored them again in the RAM 256 so as to be used as the pointer control data.

The switch 259 is composed of predetermined keys of the keyboard, the digitizer, etc. and a click button of the mouse, which are used to transmit an operator's response to a displayed message or to select a menu designated by the pointer.

The CPU 261 of the display processing system controls the communication with the CPU 251 through the parallel interface 261 or the display controller 262. In response to the display control instructions from the CPU 251, CPU 261 commands the display controller 262 to execute processing in accordance with the instructions. In accordance with instructions of the CPU 261, the display controller 262 controls the display 263. For instance, in the case where the instruction of the CPU 261 is a pointer moving instruction, the display controller 262 moves the pointer to a designated position on the picture of the display 263.

FIG. 26 shows a pointer control program stored in the ROM 253, that is, a flowchart of the procedure of the CPU 251.

When power is turned on (in step S101), the CPU (referred to as control, hereinafter) 251 executes initialization to clear the internal registers, counters, RAMs 254 to 256 (in step S102).

Further, control displays the pointer on a reference position (X1, Y1) on the display 126 (in step S103) and displays a message of "Depress switch 259 by seeing the pointer" on the display 263. When the switch 259 is depressed, control detects the eye positions and stored the coordinates (x1, y1) of the detected eye positions in the RAM 254 (in step S104).

Control deletes the pointer at the position (X1, Y1) on the display 263, and displays another different pointer at a position (X2, Y2), and further displays a message of "Depress switch 259 by seeing the pointer" on the display 263 (in step S105). Here, the position (X2, Y2) is selected so that the following matrix becomes a full rank:

$$\begin{vmatrix} X1 & X2 \\ Y1 & Y2 \end{vmatrix}$$

Further, control detects the eye positions again (in step S106), and stored the coordinates (x2, y2) in the RAM 254, and deletes the pointer and the message on the display 263.

Control obtains 2×2 matrix A on the basis of the two points (X1, Y1) and (X2, Y2) on the display 263 and the two points (x1, y1) and (x2, y2) corresponding thereto on the image data in accordance with the following formula:

$$A = \begin{vmatrix} x1 & x2 \\ y1 & y2 \end{vmatrix} \begin{vmatrix} X1 & X2 \\ Y1 & Y2 \end{vmatrix}^{-1}$$

The calculated matrix is stored in the RAM 254 (in step S107).

This matrix A is a coordinate conversion matrix for determining the pointer position on the display on the basis of the eye positions of the image data taken by the TV camera 257.

After the above-mentioned conversion matrix A has been obtained, control detects the eye positions on the basis of the new image data taken by the TV camera 257, and stores the coordinates (x, y) in the RAM 254 in step S108. Further, control calculates the pointer position (X, Y) to be displayed on the display 263 in accordance with the following formula in step S109:

$$\begin{vmatrix} X \\ Y \end{vmatrix} = A \begin{vmatrix} x \\ y \end{vmatrix}$$

The calculated pointer position signals are outputted to the parallel interface 261 in step S110, and control returns to the eye position detection in step S108.

Upon reception of the pointer position signals from the parallel interface 261, control commands the display controller 262 to output the pointer position.

When the switch 259 at hand is depressed, in response to this switch-on signal, control 251 selects the current pointer position signals.

FIG. 27 shows the detailed eye position detecting processing executed in steps S104, S106 and S108 of the flowchart shown in FIG. 26.

With reference to FIG. 27, the operation of the microprocessor (CPU) 25 shown in FIG. 25 will be described hereinbelow. CPU (control) first writes image data for one frame obtained by the TV camera 257 in the RAM 255 (in step S201), binarizes these image data (in step S202), and stores the binary data indicative of the presence or absence of image data of one-bit for each pixel (in step S203).

Then, the central positions of the pupils of the eyes on the basis of these binary data are detected (in step S204).

Upon failure of the central position detection, detection-check counters (not shown) are incremented (in step S206), and further checks whether the counter value reaches some value, for example, 15, which is easy to be expressed by a 4-bit counter (in step S207). If does not yet reach 15, control decrements a binary reference value (in step S209) and re-executes the binarization processing (in steps S202 and S203) and the position detection (in step S204) on the basis of the changed reference value. When the position detection fails 16 times, the image data are judged not to be appropriate for detection processing and the detection-check counters are cleared (in step S208), returning to the pointer display. The causes of failure may be the absence of eyes'image on the data, poor contrast of the image, etc. In this case, the image data are sensed again to detect again the eye position detection.

Upon success of the pupil position detection, the detection-check counters are cleared (in step S205), and proceeds to any of steps S105, S107 and S109 shown in FIG. 26.

As described above, in the first embodiment of the man-machine interface system according to the present invention, the facial expression of the operator is always monitored; the feeling of the operator is guessed in order to check the skillfulness of the operator in system operation on the basis of the image signals; and the operating instruction display is selectively switched. Therefore, it is possible to select an appropriate display instruction according to the operators, with the result that it is possible to provide an appropriate instruction to the operator at all times and to improve the operating efficiency of the operator, being different from the conventional predetermined or fixed operating instruction.

Further, in the conventional system, an adviser is always required for the automatic cash dispenser, for instance in order to assist old or young operators who cannot handle the cash dispenser on the basis of only fixed operating instruction. In case of the system according to the present invention, it is possible to eliminate such an adviser and thereby to automatize the attendance on customers without trouble.

Further, in the second embodiment of the man-machine interface system according to the present invention, the operator's eye motion is detected on the basis of image signals, and the pointer is moved according to the detected eye motion so that the pointer can be moved on the display picture in response to the movements of the operator's eyes or face. Accordingly, it is possible to increase the operation speed and to decrease the operation difficulty, without moving his hand so much.

Figure 28:
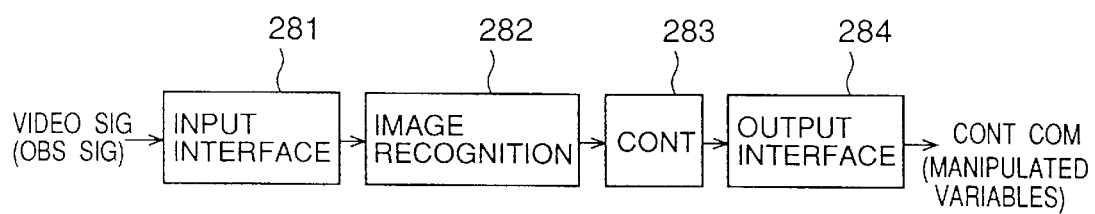
FIG. 28 is a block diagram showing a first embodiment of a one-loop controller according to the present invention.

A one-loop controller using the information recognition system according to the present invention will be described using the attached drawings. FIG. 28 is a block diagram showing an embodiment of a process controller of the present invention. The process controller comprises an input interface section 281, an image recognition section 282, a control section 283, and an output interface section 284. The input interface section 281 acquires video signals inputted by a TV camera or CCD camera (both not shown), converts the acquired data into image pattern data processed by the computer, and stores the converted image data in a memory of the interface CPU. The image recognition section 282 outputs recognition results of the image information transmitted by the input interface section 281 and in accordance with a recognition algorithm.

Figure 29:
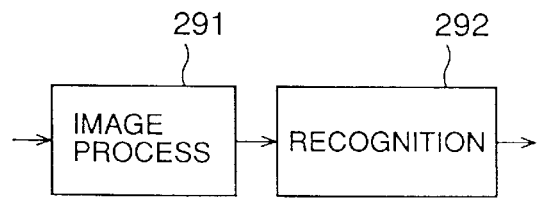
FIG. 29 is a block diagram showing an embodiment of the image recognition section of the controller shown in FIG. 28.

FIG. 29 shows an example of the image recognition section 282 composed of an image processing section 291 and a recognition section 292. The image processing section 291 extracts the feature variables of the various feature parameters Xn of the image by detecting image edges or in accordance with an algorithm such as FFT (first Fourier transform) analysis. The recognition section 292 (which is a multilayer neural network as shown in FIG. 1A) using the extracted various feature parameter values classifies the parameter values by pattern matching, and outputs classification matching scores.

Figure 30:
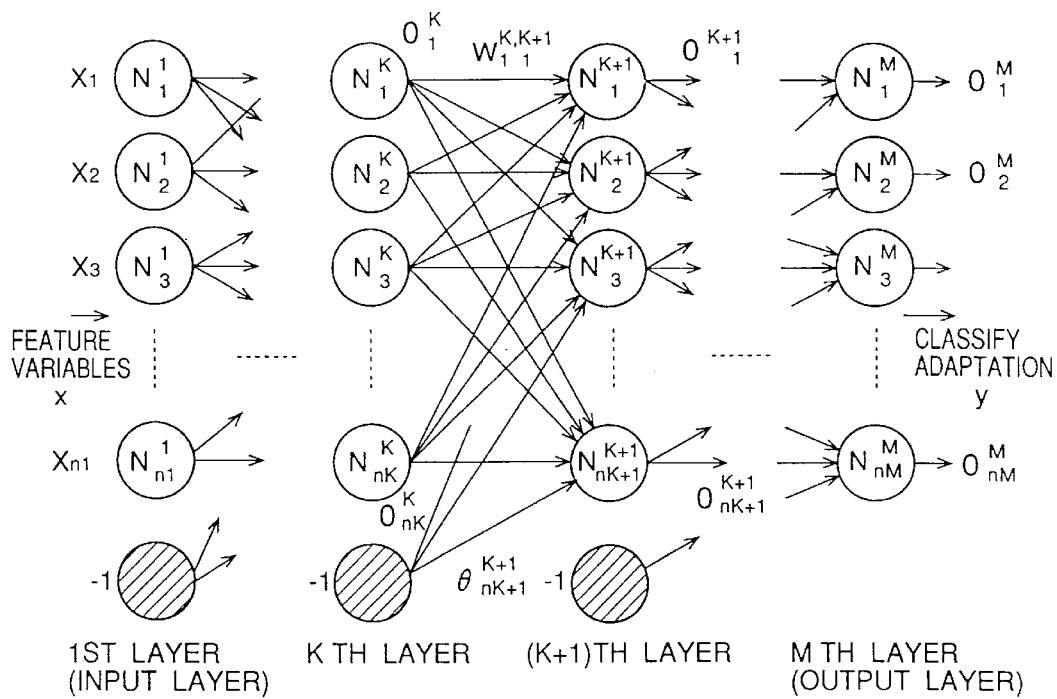
FIG. 30 is a block diagram showing a multilayer neural network.

FIG. 30 is a block diagram showing a multilayer neural network in which the number of the inputted feature parameters is $n_s$, and the number of the outputted classifications is $n_M$. Further, the weight coefficients at the respective nodes of the neural network is learned by giving the classifications of the various feature parameters as teacher data using the known method such that back propagation method, Vogl method, etc.

In FIG. 28, the control section 283 executes algorithms to obtain operation parameter set values of a process to be controlled and control commands such as operation commands for actuators within a plant, according to pattern recognition results of the image recognition section 282.

Figure 31:
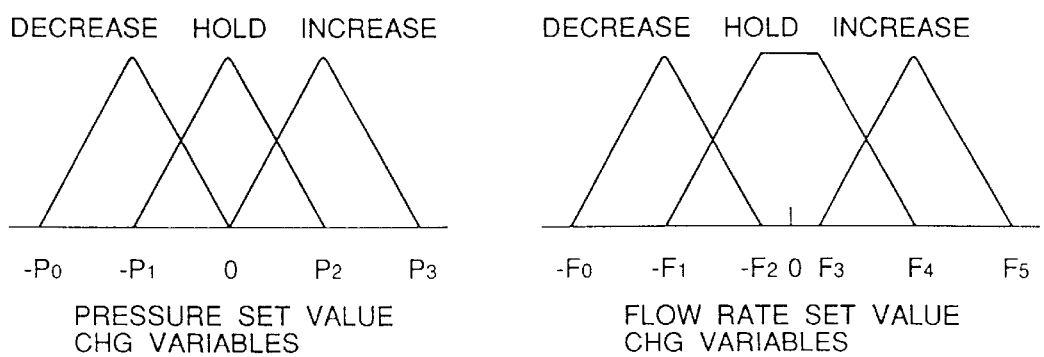
FIG. 31 is graphical representation showing membership functions of a conclusion section.

An example of algorithm of the control section 283 will be explained with reference to FIG. 31.

In response to the classification adaptation which is the recognition results of the neural network of the recognition section 292, the control section 283 decides the control commands on the basis of fuzzy inference.

For instance, in the case where an air pressure set value and an air flow rate set value are changed in a plant boiler by classification results of the image patterns, the rules used for the fuzzy inference is as follows:

If the pattern is 1, the air pressure set value is increased and the air flow rate set value is decreased;

If the pattern is 2, the air pressure set value is increased and the air flow rate set value is kept as it is;

:

:

If the pattern is $n_M$, the air pressure set value is decreased and the air flow rate set value is increased.

When the outputs of the control section 283 are the respective set values, the inferred results are added to the preceding set values and then outputted. When a subordinate controller is provided with functions of calculating the set values, it is also possible to output the change rates of the set values directly.

In the fuzzy inference of the present invention, the recognition results of the neural network are used as the adaptations as they are, without calculating the adaptations in the condition section as with the case of the ordinary fuzzy inference. Further, in the conclusion section, the conventional method is used such as MAX gravity center method, added gravity center method, etc., for instance. Further, FIG. 31 is an example of the conclusion membership functions of the above-mentioned rules adopted for the fuzzy interference.

The output interface section 284 shown in FIG. 28 outputs the calculation results of the control section 283 to process actuators (not shown) or respective controllers of subordinate distribution-type control systems.

Figure 32:
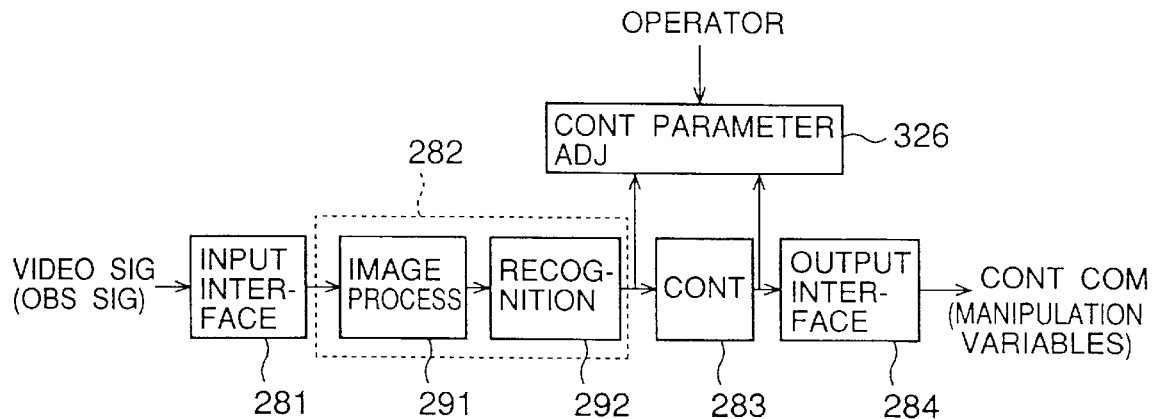
FIG. 32 is a block diagram showing a second embodiment of a one-loop controller according to the present invention.

FIG. 32 is a block diagram showing another one-loop controller according to the present invention. In this embodiment, in addition to the one-loop controller shown in FIGS. 28 and 29, there is provided a control parameter adjusting section 326 (having an interface section for the external signals inputted by the operator, for instance) for adjusting the parameters of the control section 283, from the output signals of the recognition section 292 and the control section 283.

Figure 33:
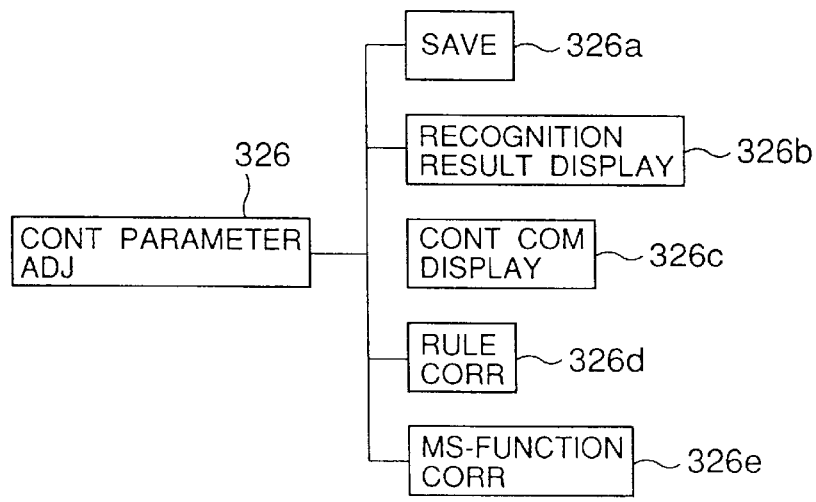
FIG. 33 is a functional block diagram showing the control parameter adjusting function according to the present invention.

The control parameter adjusting section 326 is described in further detail hereinbelow. As shown in FIG. 33, the control parameter adjusting section 326 is provided with a saving function 326a for storing the recognition results of the neural network and the control commands by the recognition results as time-series data, a recognition result display function 326b for displaying the time trend of the neural network recognition results saved by the saving function 326a, a control command display function 326c for displaying the time trend of the control commands saved by the saving function 326a, a rule correcting function 326d for correcting the rules used for the fuzzy inference, and a membership function correcting function 326e for correcting the membership functions used for the fuzzy inference.

Figure 34:
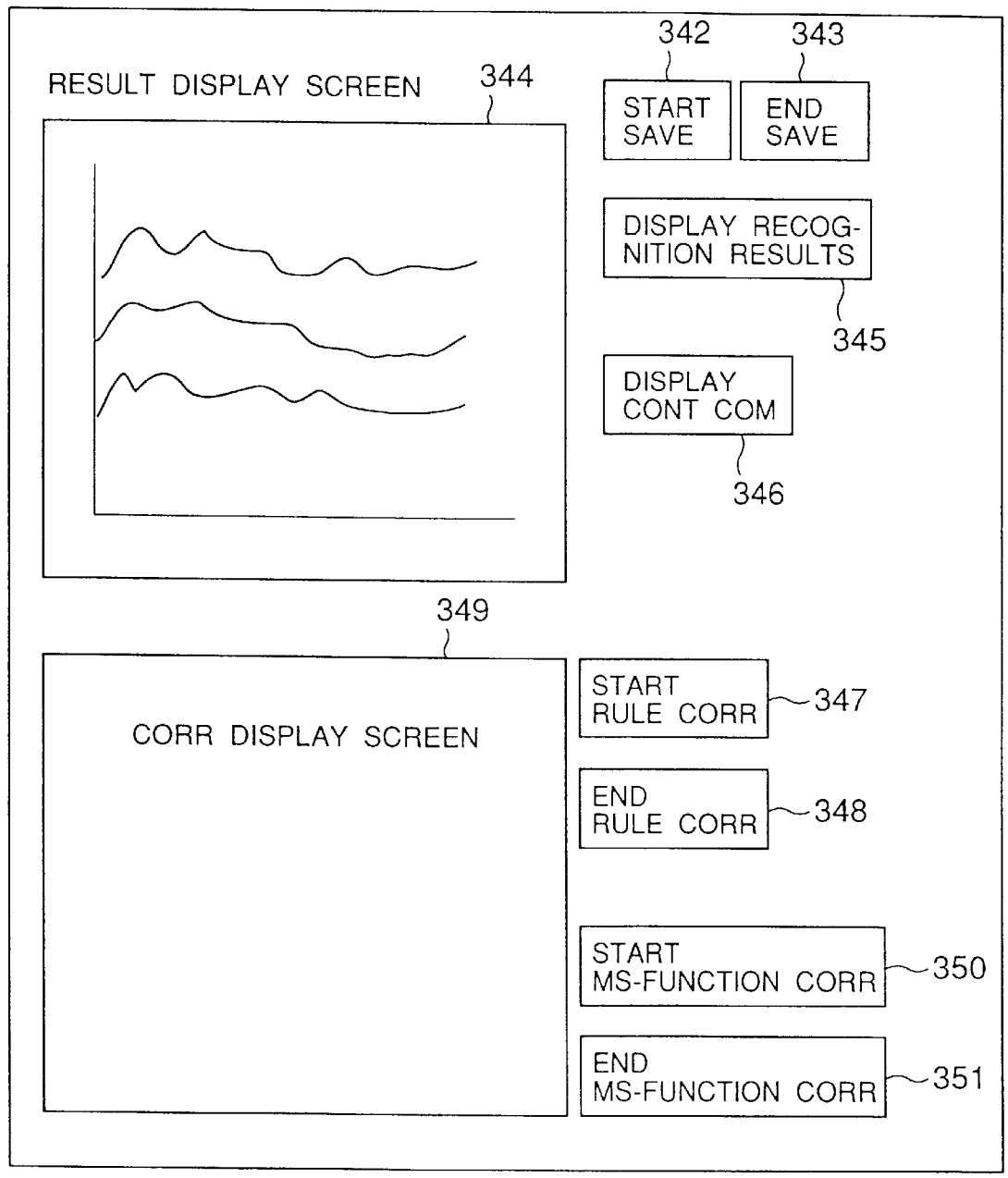
FIG. 34 is an illustration showing an embodiment of an operation display picture for realizing the control parameter adjusting function.
Figure 36:
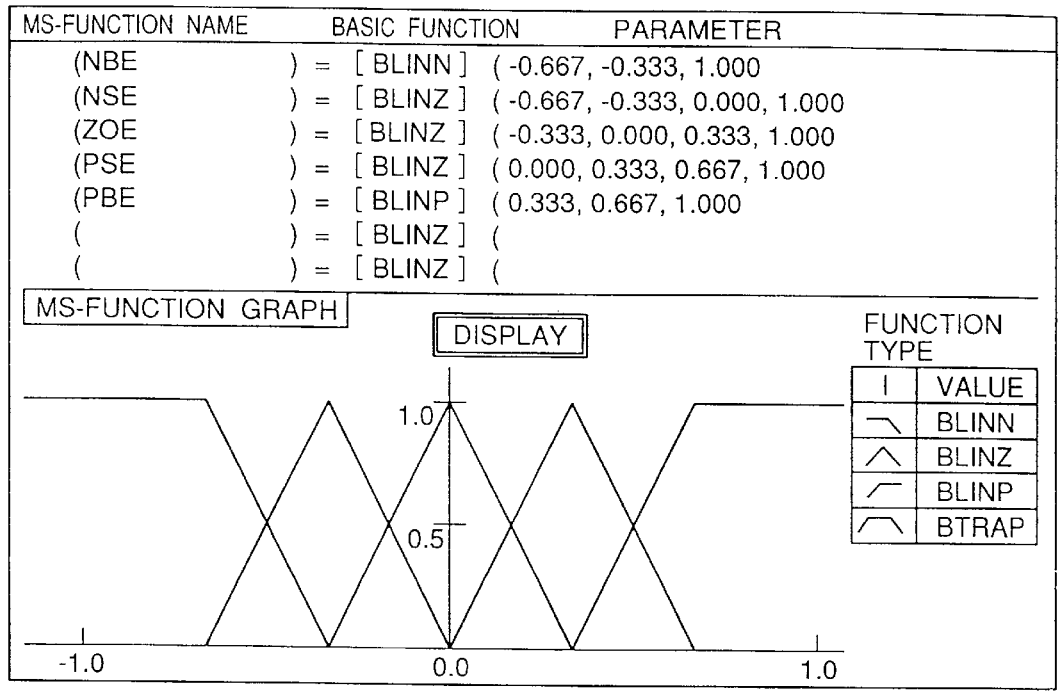
FIG. 36 is an illustration showing an embodiment of an operation display picture for realizing the membership function correcting function.

The respective functions of the control parameter adjusting section 326 will be described in detail hereinbelow with the use of the operation display pictures on the computer display. FIG. 34 is an example of the operation display picture, in which the man-machine interface related to the saving function 236a can be achieved by a start save icon 342, an end save icon 343, and a result display screen 344. On the result display screen 344, the recognition results and the control commands are monitored and displayed as time trend graph. When the operator designates the save start icon 342 with a pointing device such as a mouse, a touch pen, etc. while seeing the monitor picture, the time-series data of the recognition results and the control commands are started to be saved. Further, when the operator designates the save end icon 343, the saving ends. The recognition result display function 326b can be achieved by a recognition result display screen 344 and a recognition result display icon 345. When the display icon 345 is designated, the time trend graph of the recognition results of the recognition section saved as the adjusting data by the saving function 326a is displayed on the result display screen 344. The man-machine interface related to the control command display function 326c can be achieved by the result display screen 344 and the control command display icon 346. When the display icon 346 is designated, the time trend graph of the control commands saved as the adjusting data by the saving function 326a is displayed on the result display screen 344. The man-machine interface related to the rule correcting function 326d can be achieved by a rule correct start icon 347, a rule correct end icon 348 and a correct display screen 349. When the rule correct start icon 347 is designated, a rule correcting picture as shown in FIG. 35 is displayed on the correct display screen 349. The rules are corrected by changing (increasing or decreasing) the fuzzy label. For the change, one of the fuzzy labels already registered is selected or a new fuzzy number is entered. When the rule correct end icon 348 is designated, the rule correcting function 326d ends after having confirmed the presence or absence of the data save. The membership function correcting function 326e can be achieved by a membership function correct start icon 350, a membership function correct end icon 351, and the correct display screen 349. When the membership function correct start icon 350 is designated, a membership function correcting picture as shown in FIG. 36 is displayed on the correct display screen 349. The membership function is corrected by changing the shape parameters. Further, when the membership function correct end icon 351 is designated, the membership function correcting function 326e ends after having confirmed the presence or absence of the data save.

Figure 37:
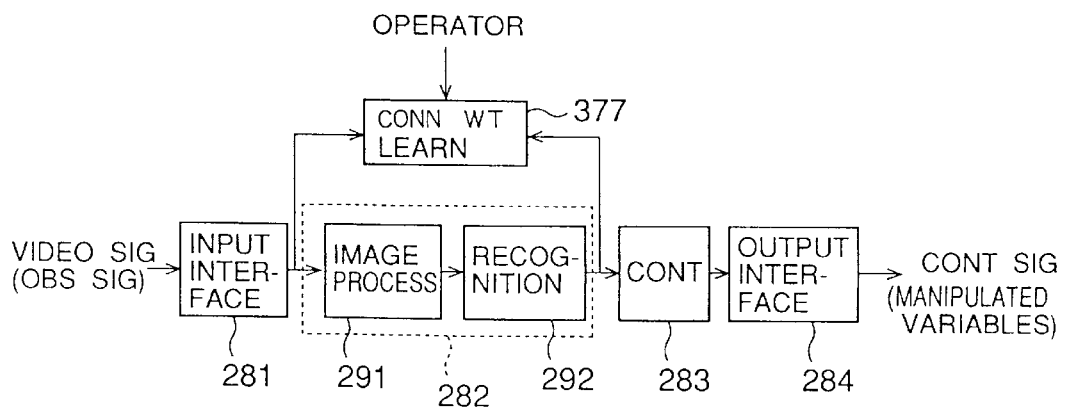
FIG. 37 is a block diagrams showing a third embodiment of the one-loop controller according to the present invention.

FIG. 37 shows another construction of the one-loop controller. In this embodiment, in addition to the one-loop controller shown in FIGS. 28 and 29, there is provided a weight coefficient learning section 377 (having an interface section for the external signals inputted by the operator, for instance) for learning the weight coefficients of the neural network of the recognition section 292, from the output signals of the input interface section 281 and the recognition section 292.

Figure 38:
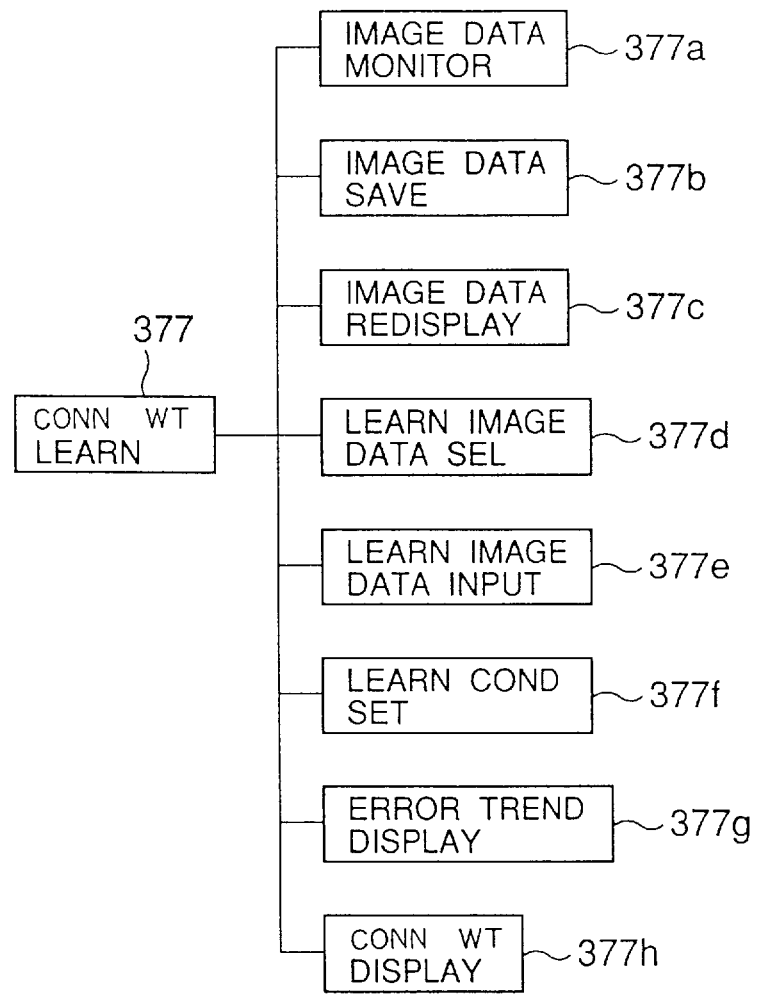
FIG. 38 is a functional block diagram showing the connection weight learning function shown in FIG. 37.

As shown in FIG. 38, the weight coefficient learning section 377 comprises an image data monitoring function 377a for monitoring the image data, an image data saving function 377b for saving the image data, an image data re-display function 377c for displaying the image data again, a learning data selecting function 377d for selecting and deleting the learning image data, a learning data input function 377e for inputting the teacher data for learning, a learning condition setting function 377f for designating the learning start and end and the number of learning times of the weight coefficients of the neural network, an error trend display function 377g for displaying the error trend between the neural network outputs and the teacher data, and a connection weight display function 377h for displaying the connection weight of the neural network.

Figure 39:
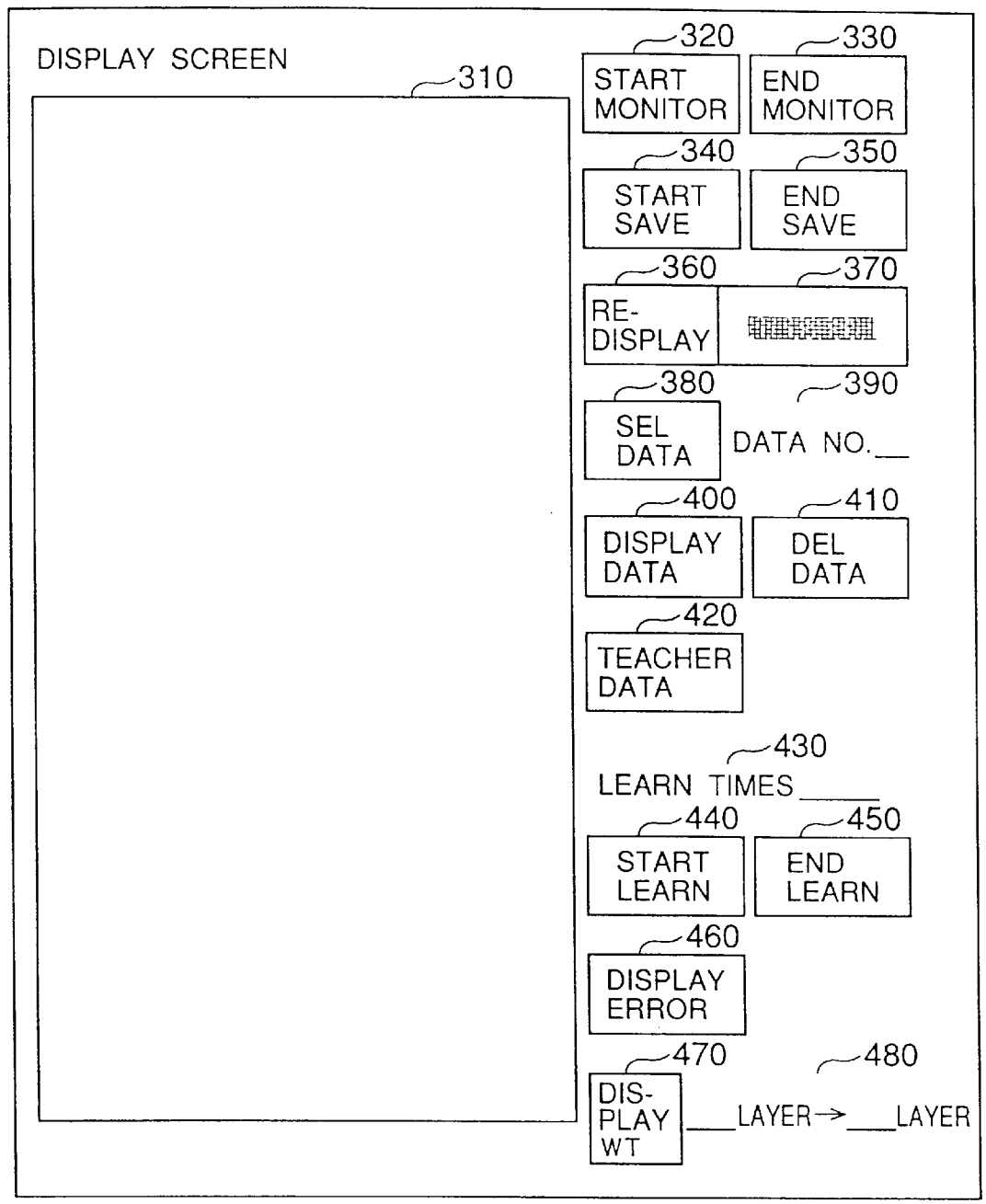
FIG. 39 is an illustration showing an embodiment of an operation display picture for realizing the weight coefficient learning function.
Figure 40:
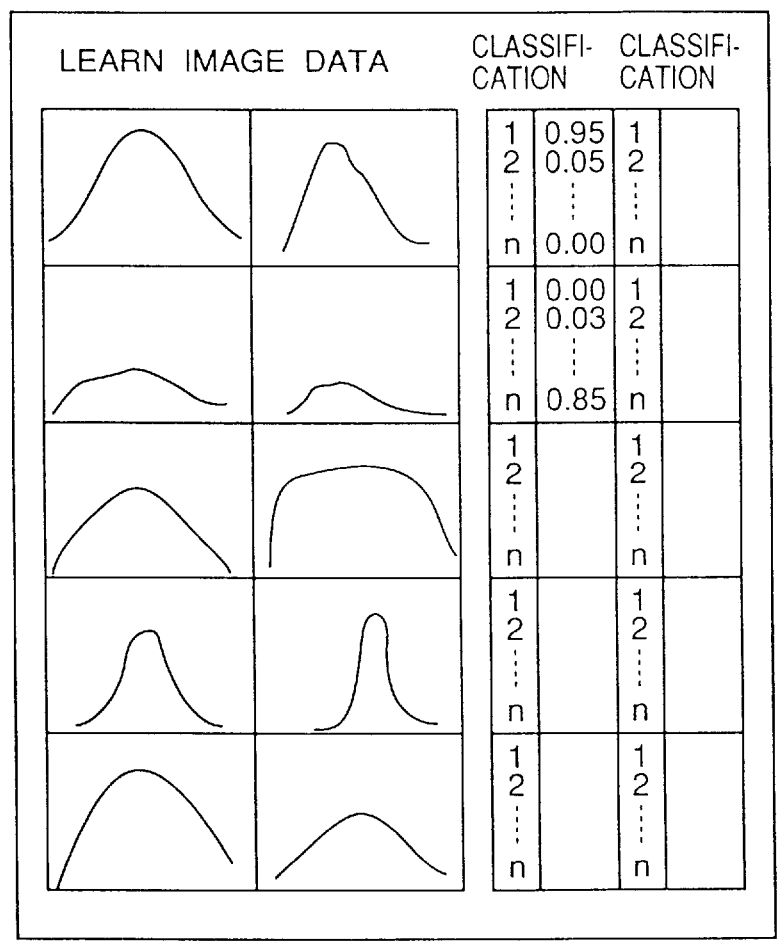
FIG. 40 is an illustration showing an embodiment of an operation display picture for realizing the teacher data input function.

The respective functions of the connection weight learning section 377 will be described in detail hereinbelow with reference to operation display pictures. FIG. 39 shows an example of the operation display picture. In the drawing, the man-machine interface related to the image data monitoring function 377a can be achieved by a display screen 310, a monitor start icon 320, and a monitor end icon 330. When the monitor start icon 320 is designated, the image data taken by the TV camera are displayed on the display screen 310, and when the monitor end icon 330 is designated, the image data monitoring ends. The man-machine interface related to the image data saving function 377b can be achieved by a save start icon 340 and a save end icon 350. When the save start icon 340 is designated, the image data being monitored are started to be saved, and when the save end icon 350 is designated, the image data saving ends. The man-machine interface related to the image data re-display function 377c can be achieved by the display screen 310, an re-display icon 360, and a re-display range designating bar 370. When the redisplay icon 360 is designated, the saved image data are displayed on the display screen 310. When a re-display time range is designated by the re-display range designating bar 370 and the re-display icon 360 is designated, the saved image data are displayed on the display screen 310 in time series fashion within the designated time range. When the re-display icon 360 is designated again, the re-display ends. The man-machine interface related to the learning date selecting function 377d can be achieved by a learning data select icon 380, a data number display 390, a learning data display icon 400, and a learning data delete icon 410. When the learning data select icon 380 is designated during the data monitor or re-display, a data number is automatically attached to the image data now being displayed, and then the data are registered. The attached data number is displayed on the data number display 390. When the learning data display icon 400 is designated, the registered learning data are displayed on the display screen 310. If unnecessary data exists, when the unnecessary data is designated and further the learning data deleting icon 410 is designated, it is possible to delete the learning data. In this case, the data numbers are corrected automatically. The man-machine interface related to the teacher data input function 377f can be achieved by a teacher data input icon 420 and the display screen 310. When the teacher data input icon 420 is designated, teacher data input windows for the registered learning image data and the classification adaptation are displayed on the display screen 310 as shown in FIG. 40, so that teacher data corresponding to the learning data are inputted. The man-machine interface related to the learning condition setting functions 377f can be achieved by a learning number input display 430, a learning start icon 440, and a learning end icon 450. When the number of learning times is entered to the learning number input display 430 and further the learning start icon 440 is designated, the weight coefficient learning section 377 executes the connection weight learning from the registered learning data and teacher data using the back propagation method or the Vogl method, etc. When the number of learning times reaches the designated number or when the learning end icon 450 is designated, the weight coefficient learning ends. The man-machine interface related to the error trend display function 377g can be achieved by an error trend display icon 460 and the display screen 310. When the error trend display icon 460 is designated, the error trend between the neural network outputs already learned or now being learned and the teacher data are displayed on the display-screen 310. The man-machine interface related to the weight coefficient display function 377h can be achieved by a weight coefficient display icon 470, a layer number designate display 480, and the display screen 310. When weight coefficients are entered to the layer number designate display 480 and further the weight coefficient icon 470 is designated, the weight coefficients after learning end are displayed on the display picture 310.

Figure 41:
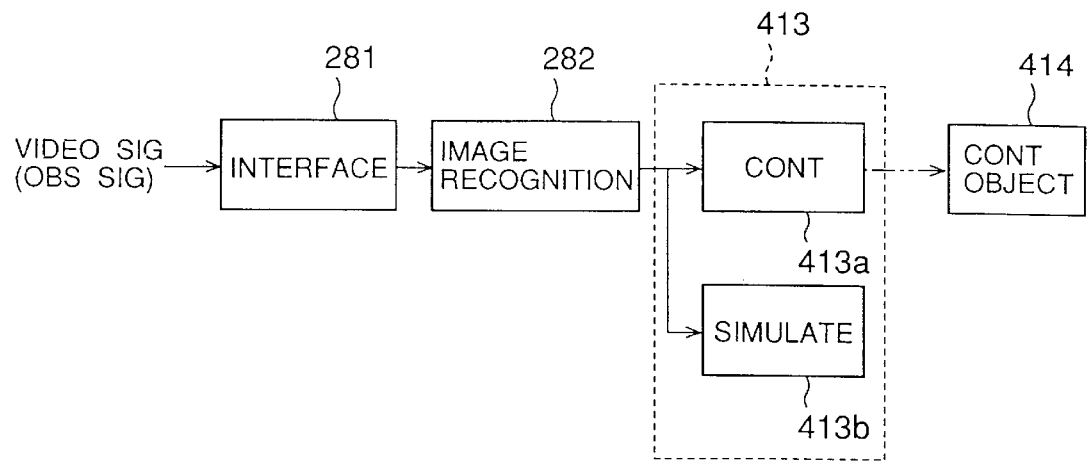
FIG. 41 is a block diagram showing a one-loop visual feedback controller according to the present invention.
Figure 42:
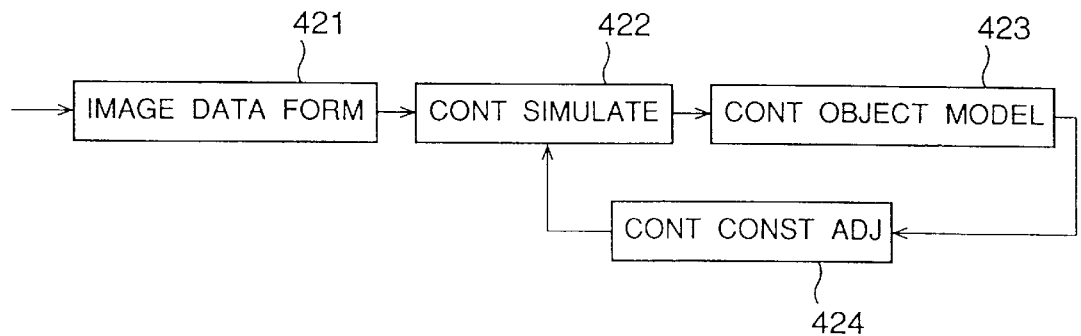
FIG. 42 is a block diagram showing a simulator section of the controller shown in FIG. 41.

Another embodiment of the one-loop controller will be described hereinbelow with reference to FIG. 41. In the drawing, an input interface section 281 and an image recognition section 282 are the same as with the case of the controller shown in FIG. 37. A control section 413 of the one-loop controller is composed of a controller 413a for actually controlling a plant and a simulator section 413b for simulating the controller 413a. Further, as shown in FIG. 42, the simulator section 413b is composed of an image data forming section 421, a control simulation section 422, a control object model 423, and a control constant adjusting section 424. The simulator section 413b simulates the controller 413a according to the following procedure to evaluate the control performance.

Figure 43:
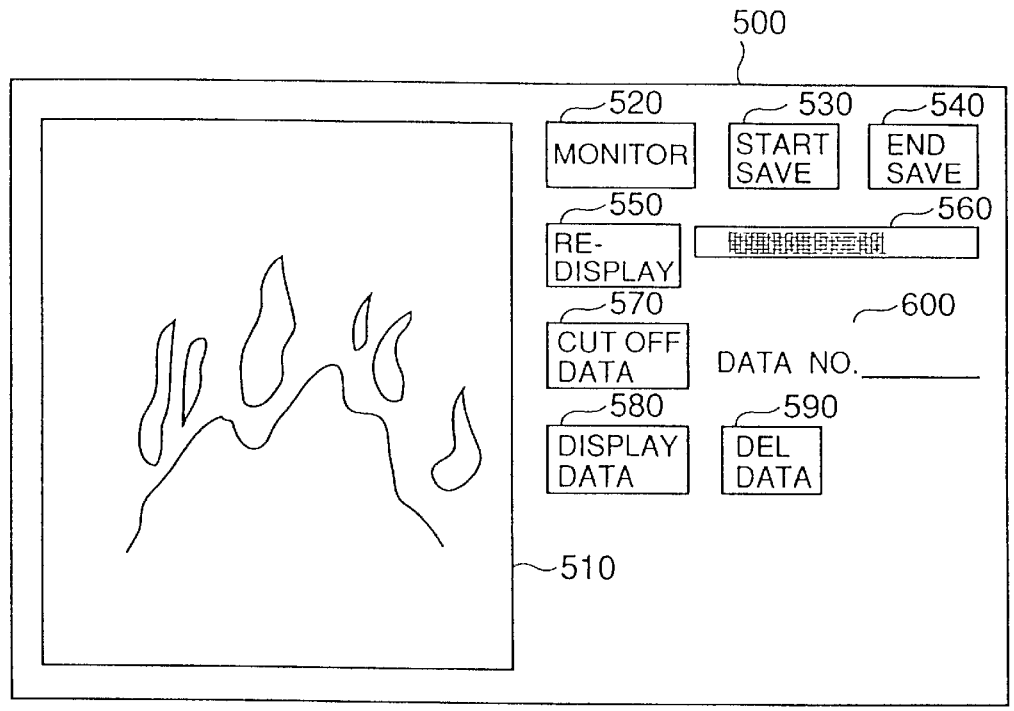
FIG. 43 is an illustration showing a menu picture for forming image data.

First, image data for simulation are formed. As shown in FIG. 43, on an image data forming menu screen 500, there are arranged an image display window 510, a monitor icon 520, an image save start icon 530, an image save end icon 540, a re-display icon 550, a re-display range designate bar 560, a data cut-off icon 570, a data display icon 580, a data delete icon 590, and a data number input display area 600. An image now being monitored is displayed in the image display window 510. When the data cut-off icon 570 is designated by a mouse for instance, the image frame at the current time point is numbered automatically as an image data file and then registered. Further, when the data save start/end icons 530 and 540 are designated, the image can be saved for any given long time. When the re-display time range of the saved image is set by the re-display range designating bar 560 and further the re-display icon 550 is designated, the saved image frames are displayed on the image display window 510 in time series fashion within a designated time range. Therefore, it is possible to cut off the image data by seeing the redisplayed image and save the cut-off data as another file. When the data display icon 580 is designated, the image window is divided into some display regions at need to display the image data so far formed as multiple pictures. In this case, when any overlapped data exist, the overlapped data display region is designated and then the delete icon 590 is designated to delete it. When the monitor icon 520 is designated after the saved image is redisplayed or after the image data are displayed, it is possible to display the image now being monitored again in the image display window.

As described above, since necessary image data required for the simulation can be formed, it is possible to obtain sufficient data for the adjustment.

Figure 44:
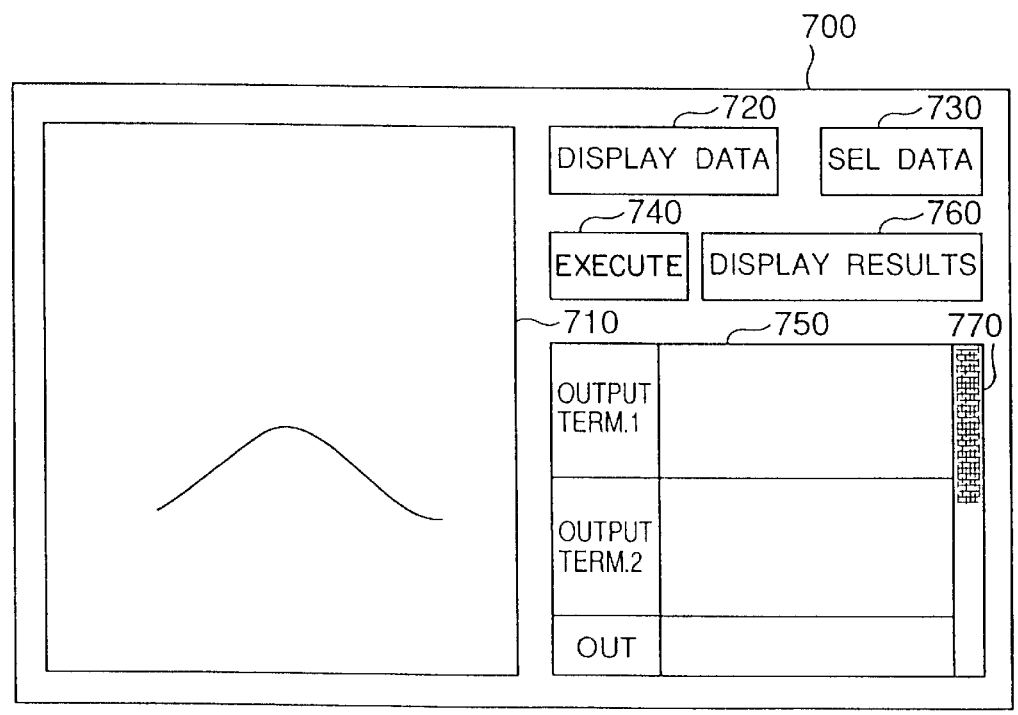
FIG. 44 is an illustration showing a menu picture for control simulation.

After the image data have been formed, the control performance is evaluated by the controller simulation. As shown in FIG. 44, on the control simulation menu screen 700, there are arranged an image data display window 710, an image data display mode switching icon 720, an image data selecting icon 730, a simulation executing icon 740, an output result display window 750, and an output result display mode switching icon 760. The image data display switching icon 720 switches a mode for displaying the image data one by one to another mode for displaying a plurality of registered image data (by dividing the image data display window 710 into a plurality of windows at need) or vice versa. In the case of the mode for displaying data one by one, since the succeeding candidate image data can be displayed whenever the image selecting icon 730 is designated, the image data required to be used for the simulation can be selected. In the case of the mode for displaying a plurality of image data, the displayed image data required to be used for the simulation can be designated by selection. Once the data used as the input image for simulation are selected, the selected image data are displayed on the image data display window 710. When the simulation execute icon 740 is designated, the output results of the respective output terminals (obtained when the selected image data are inputted) are displayed on the output result display window 750. Here, it is possible to switch the display format from a numerical type to a graphical type or vice versa by designating the output result display mode switching icon 760. When the number of the output terminals is large so that the output results cannot be displayed on the output result display window 750 simultaneously, it is possible to see the output results by scrolling the display contents with the use of a scroll bar 770.

Accordingly, since it is possible to easily evaluate the control performance on various input images and further compare the control performance on the same input image while adjusting the control constant by the control constant adjusting section 424 shown in FIG. 42, the control section 413 can be adjusted before installed in the one-loop controller.

Figures 45A, 45B:
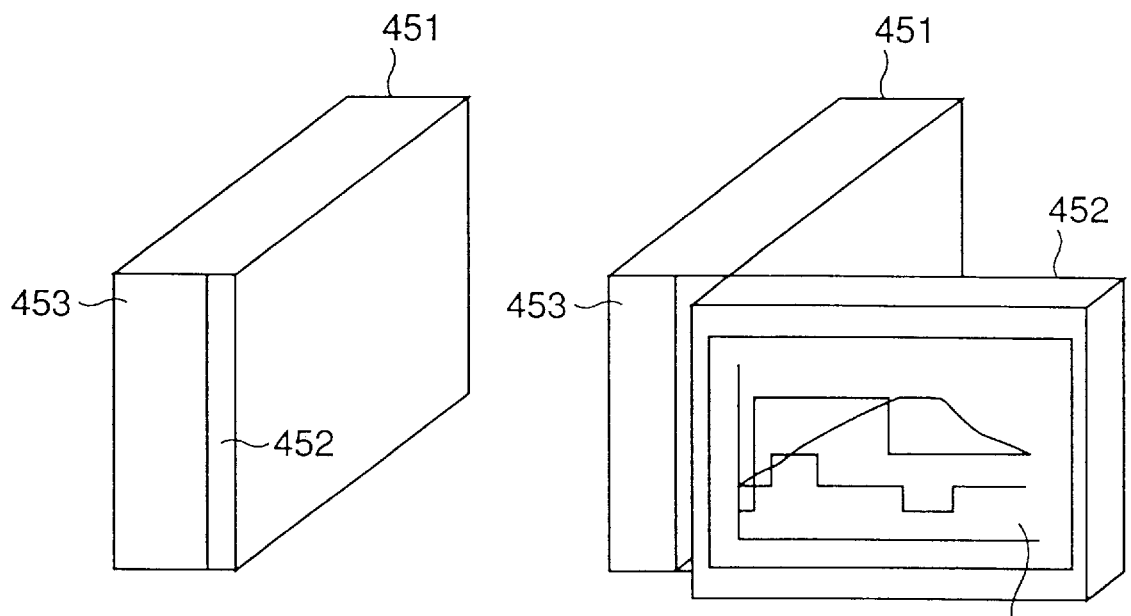
FIGS. 45A and 45B are illustrations showing a one-loop controller provided with a drawer type display panel arranged on the inner side surface of a rack.

Another embodiment of the one-loop controller will be described hereinbelow with reference to FIGS. 45A and 45B. In FIG. 45A, a plurality of the one-loop controller are accommodated in a rack (not shown) so as to be drawn. On the left or right side surface of a controller body 451, a monitor screen section 452 is provided. The monitor screen section 452 is of a display of panel type. As shown in FIG. 45B, the screen section 452 is drawn frontward from a rack and further opened in the right or left direction so as to be arranged in parallel to the front surface of the controller body 451. On the surface of the monitor screen section 452, a monitor screen 454 is assembled to display operation parameters such as target values (set value), manipulated variables, controlled variables, etc. in time-series fashion. By seeing the operation parameters, the operator can perform necessary operation by use of an input section arranged on a controller body front surface 453 and icons (not shown) displayed on the monitor screen 454.

Further, it is also possible to mount a plurality of small monitor screen sections 454 on one surface of the monitor screen section 452 or to assemble a plurality of monitor screens 454 on both the surfaces of the monitor screen section 452. The monitor screen 454 can be accommodated within the rack where unnecessary, therefor, there exists such an advantage that the monitor screen 452 can be prevented from scratches or dirt.

Figure 46:
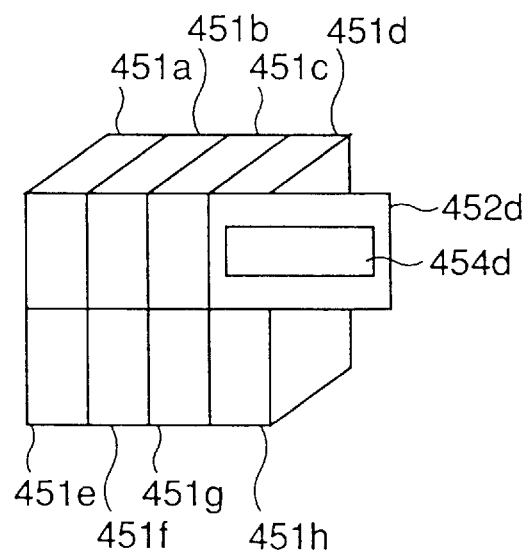
FIG. 46 is an illustration showing an example of installing a plurality of one-loop controllers.

Further, as shown in FIG. 46, it is also possible to accommodate a number of controllers 451a to 451h within an accommodating rack. In this case, since only a screen section 452d having a necessary monitor screen 454d is drawn open as occasion demands, it is possible to arrange the controllers without increasing the installation space.

Figure 47:
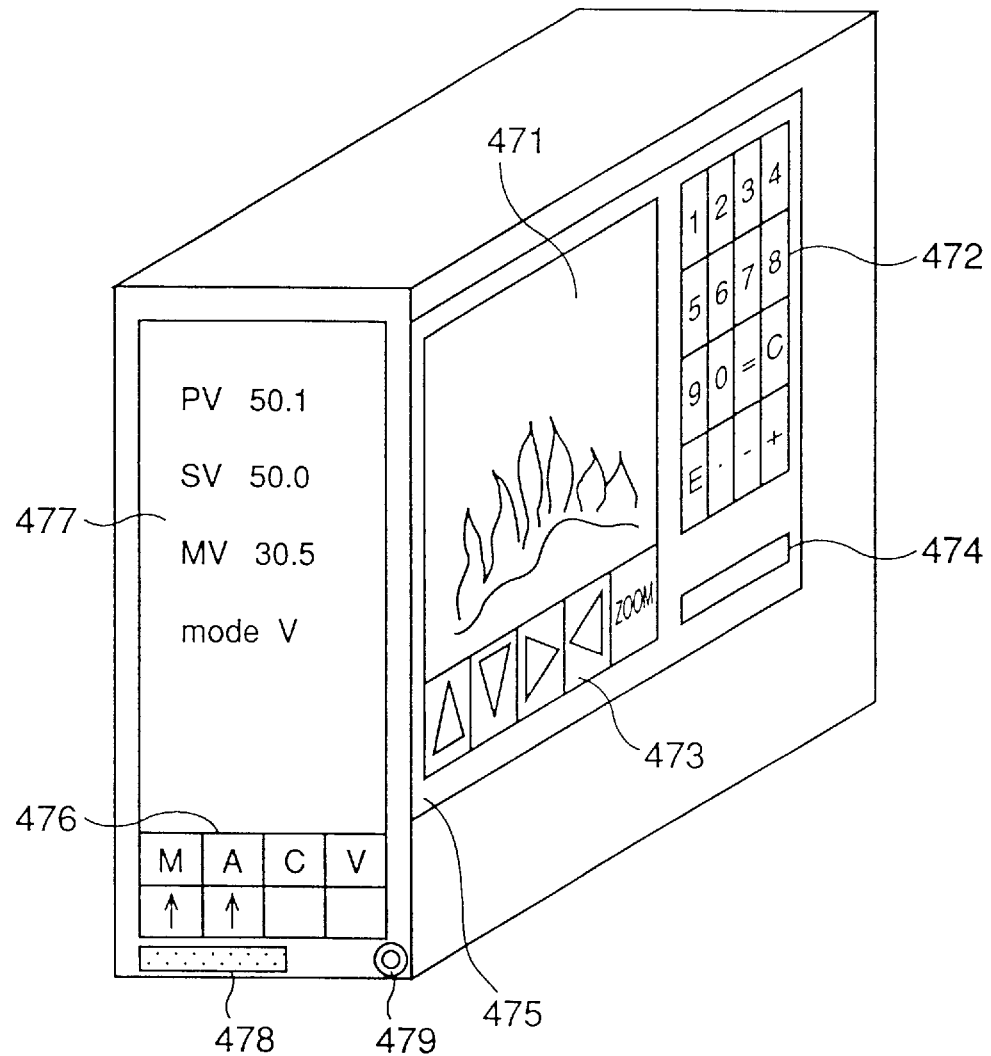
FIG. 47 is an illustration showing an example of the one-loop controller having a display panel on a side surface of a rack.

FIG. 47 is another example of the controller provided with a monitor screen section of slide type on the side surface thereof. On the right side of a monitor screen 471, a data input panel 472 is arranged. Further, under the monitor screen 471, picture operating keys 473 for designating a camera direction, zooming magnification, etc. are arranged. Further, under the data input panel 472, a memory card 474 can be assembled. The monitor screen 471, the data input panel 472, the picture operating keys 473 are all mounted on a slide panel 475 which can be drawn in the frontward direction so as to be opened in parallel to the front surface of the controller main body. On a narrow front surface panel, there are arranged a switch panel 476 for designating various control modes (M: manual mode; A: automatic mode; C: cascade mode; and V: visual mode) and a display panel 477 for displaying operating parameters (PV: control variables; SV: target (set) values; MV: manipulated variables), an external output terminal section 478 to which a measuring instrument such as a plotter recording apparatus can be connected, and an earphone terminal 479 for listening sound (e.g., combustion sound) generated by an object to be controlled.

Figure 48:
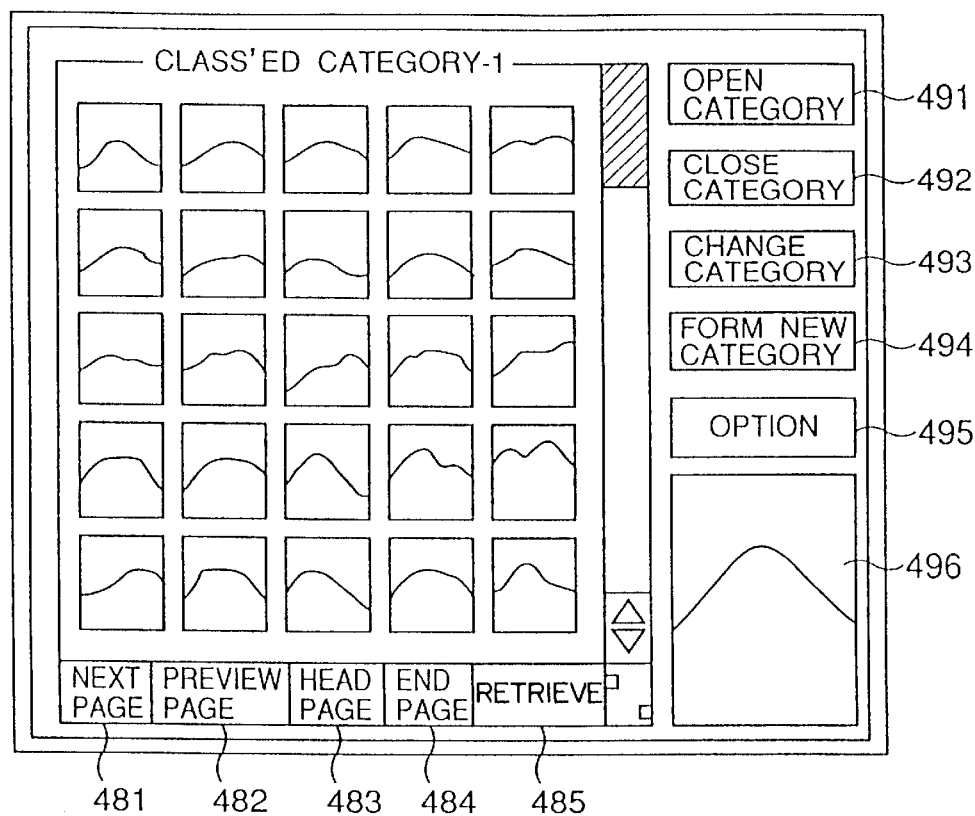
FIG. 48 is an illustration showing an example of the display picture of the image data displaying apparatus.
Figure 49:
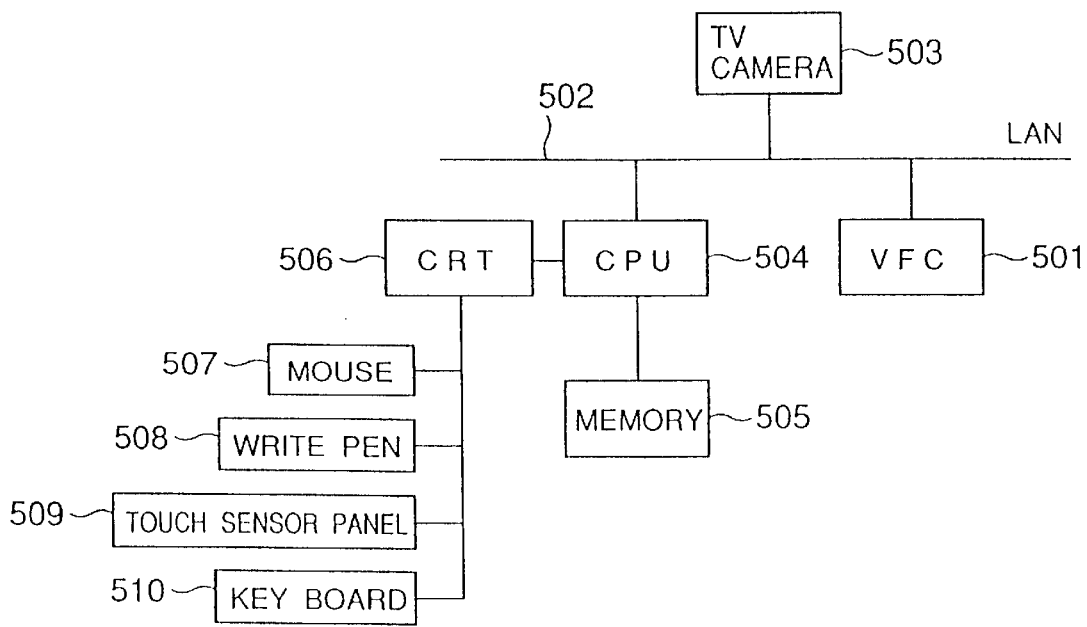
FIG. 49 is a block diagram showing a hardware construction of the image data display apparatus.

FIG. 48 shows another example of the picture of the image data display apparatus according to the present invention, and FIG. 49 shows a hardware construction of the present invention. In FIG. 49, the system comprises a visual feedback controller (VFC) (one-loop controller) 501, a local area network (LAN) 502, a TV camera 503, a computer 504, a memory device 505, a CRT display terminal apparatus 506, a mouse 507, a write pen 508, a touch sensor panel 509 and a keyboard 510, and operates in the same way as in the ordinary computer.

On the display picture of the image display terminal apparatus 506 of the present embodiment, as shown in FIG. 48, a plurality of image data belonging to the same category are displayed simultaneously. Further, various icons for activating various functions for picture operation are arranged on the right side and lower side of the picture. When these icons are designated by use of the pointing devices such as the mouse 507, the write pen 508, the touch sensor panel 509, etc., it is possible to activate the functions of the designated icons to classify the image data effectively.

By use of the function icons 481 to 484 arranged under the-picture shown in FIG. 48, it is possible to activate the functions for shifting the displayed picture to the succeeding page, the preceding page, the head page and the final page, so that the huge image data can be inspected efficiently. Further, the retrieve function icon 485 activates the function of retrieving image data using a numerically represented image data feature or a number of the image data.

In FIG. 48, on the right side of the picture, an icon 491 for "Open category" is prepared to display the image data of desired category. Further, an icon 492 for "Close category" is prepared to close the file of the category now being displayed. Further, by use of an icon 493 for "Change category attribute", it is possible to activate a subroutine for changing the image data features determined by the category. Further, it is also possible to change or correct the evaluation criteria used for the image data classification by use of this icon 493. Further, by use of an icon 491 of "Form new category", a new category can be formed. In addition, an icon 495 of "Option" is prepared as a menu to activate various functions. As the optional functions, there are a function for enlarging only the display of designated image data, a function of rearranging the image data of the same category on the basis of the designated feature, a function of moving the designated image data to any given position, a function of converting the designated image data to any given designated category, a function of designating the image data display size, a function of designating the image data belonging to different categories and displaying the image data on a reference picture, a function of displaying any given image data or the reference image data over any given other image data each other, a function of displaying only image data of designated feature in different color, a function of determining the order of the image data used for learning, a function of rearranging the image data belonging to the same category at random, etc. Further, when the image data are newly registered, a registered image data picture is displayed and then the feature of the image data is memorized as a numerical value according to the evaluation criterion.

As described above, it is possible to classify the image data effectively, by displaying the image data belonging to the same category simultaneously so as to be compared with each other in shape.

Figure 50:
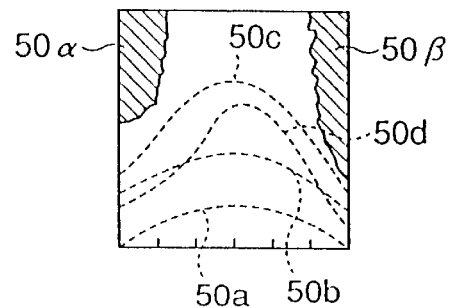
FIG. 50 is an illustration showing an example of the monitor picture of an object to be controlled.

FIG. 50 shows an example of the monitor picture, in which the shape of char bed (ash) of a recovery boiler in a paper plant is monitored by a TV camera of a visual feedback controller for controlling fuel pile and combustion conditions. Further, in FIG. 50, the contours 50a, 50b, 50c and 50d are the char bed shapes required to be recognized. Further, in FIG. 50, numerals 50α and 50β denote dust attached onto the camera lens (that is noise in image information).

Figure 51:
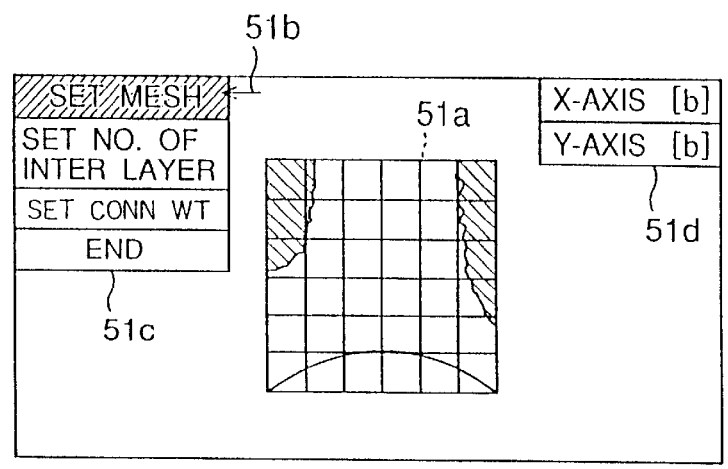
FIG. 51 is an illustration showing an example of the monitor picture, in which the image is divided into small regions by inserting meshes thereon.

When the monitor picture is taken by the neural network and then displayed on a picture, the monitor picture shown in FIG. 50 is displayed as shown in FIG. 51. In FIG. 51, a pointer 51b (whose position is controlled by a pointing device such as a mouse or touch pen) and a menu 51c are shown.

When the pointer 51b is shifted to an icon of "Set meshes" of the menu 51c and then designated for selection, icons for inputting meshes are displayed on the picture, as shown by 51d in FIG. 51. When icons of "x-axis and y-axis" are selected by the pointer and further numerical values of intervals in X-axis and Y-axis directions are entered through the keyboard, meshes corresponding to the entered numerical values are displayed on the picture 51a. Further, it is also possible to store the numbers of meshes previously as default values.

Figure 52:
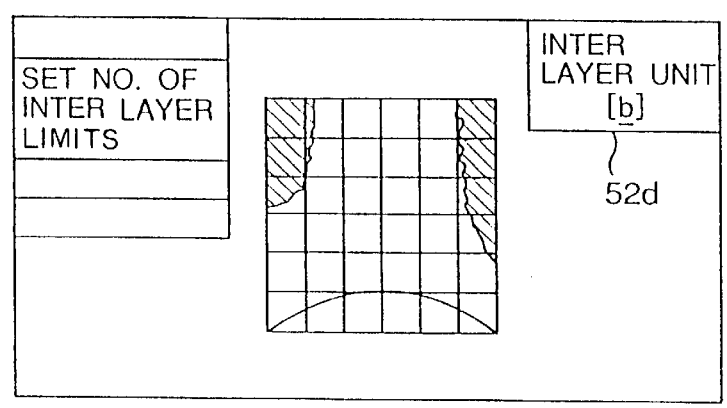
FIG. 52 is an illustration showing an example of the display picture, in which a window 52d is displayed to input the number of intermediate layer units.

When the icon of "Set number of intermediate layer units" of the menu 51c is selected by the pointer 51b in FIG. 51, a window 52d for setting the number of intermediate layer units is displayed as shown in FIG. 52. Therefore, it is possible to set the number of the intermediate layer units by shifting the pointer to this window and further entering a numerical value through the keyboard.

Figure 53:
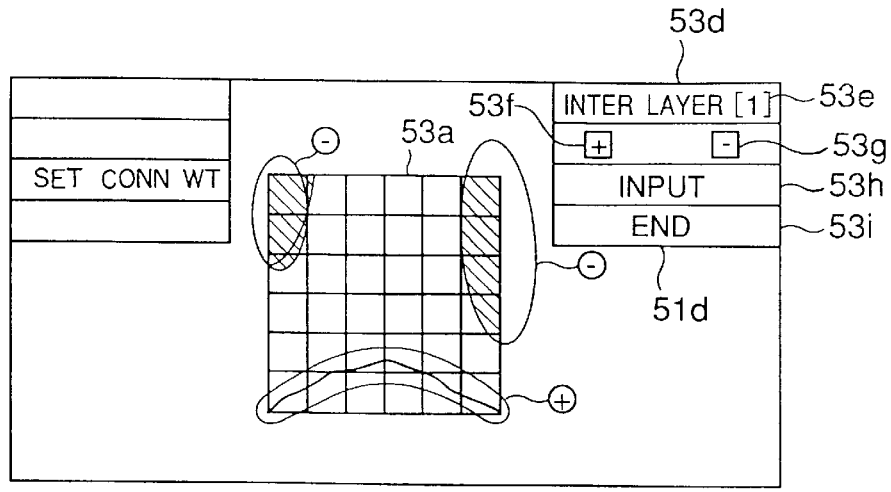
FIG. 53 is an illustration showing an example of the display picture, in which the connection weights are set by grouping the divided images of an object to be controlled.

When the icon of "Set connection weight" of the menu 51c is selected by the pointer 51b in FIG. 51, a window 53d for setting the connection weight from the input layer unit to the intermediate layer unit is displayed as shown in FIG. 53. Further, a numerical value 53e indicative of a number of the intermediate layer units is displayed in the window 53d. Therefore, it is possible to change this numerical value by shifting the pointer to this window and further entering a numerical value through the keyboard. When the icon 53f of "Input" is selected and further a closed area is designated by the pointer in the picture 53a (on which an image of an object to be controlled is displayed), the connection weights from the input layer units corresponding to the closed area to the intermediate layer units are defined by random numbers whose averaged value is slightly larger than that in the other areas. When an icon 53g is selected, the similar connection weights are set by random numbers whose averaged value is slightly smaller that in the other areas. Here, the overlapped areas are handled as the nondesignated areas and set by random numbers. In FIG. 53, the surrounding of the char bed shape required to be recognized is set to an area designated by an icon 53f (+), and the other portions (to which dust adhere) are set to areas designated by an icon 53g (−). Further, when the input icon 53h is selected, the setting of the connection weights from the input layer units to one intermediate units ends.

Figure 54:
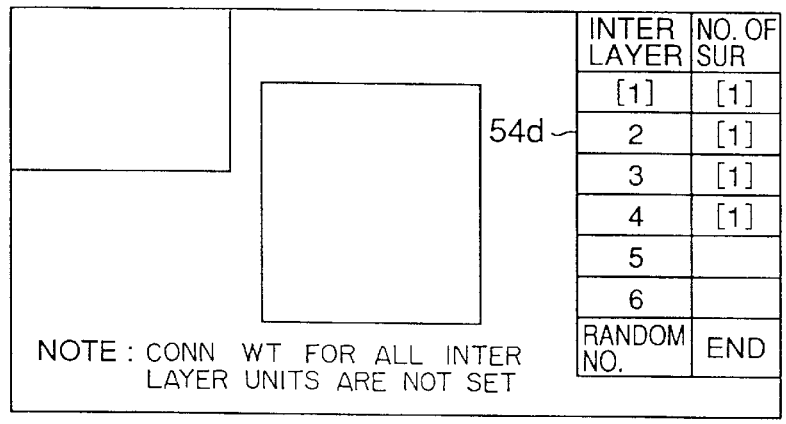
FIG. 54 is an illustration showing an example of the display picture, in which warning is indicated when the number of shapes to be recognized is smaller than the number of the intermediate layer units.

When an icon 53i of "End menu" is selected, the coupling weight setting ends. Here, when the number of the shaped to be recognized is smaller than the number of intermediate layer units, as shown in FIG. 54, a warning message is displayed and further a window 54d for setting the connection weights for the remaining intermediate layer units is displayed. In the window 54d, a number of the intermediate layer units and the number of setting image data pictures of the connection weights corresponding thereto are displayed. Through selecting a number of the intermediate layer units by the pointer and further a numerical value is entered through the keyboard or by designating the bar graph by the pointer, it is possible to allocate the number of the pictures for the connection weight setting so that the number of the picture correspond to the undefined intermediate layer units to the remaining intermediate layer units. Accordingly,, it is possible to increase the recognition priority for the classification, by increasing the setting image data pictures corresponding to some classification. When the connecting weighs for the remaining intermediate layer units are not required to be set, an icon of "Random number" is selected. When an icon of "End" is selected in FIG. 54, the picture in FIG. 53 is shown again. Therefore, an icon of "End" is again selected in the menu 51c to end the setting.

Figure 55:
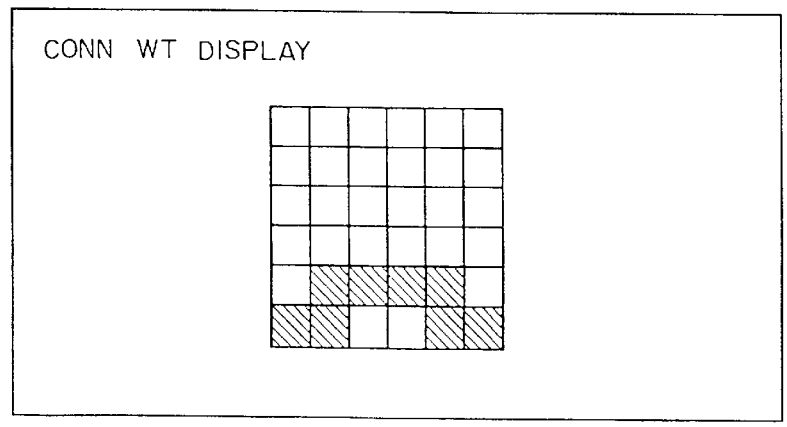
FIG. 55 is an illustration showing an example of the display picture, in which coupling weights are displayed.

After the connection weights from the input layer units to all the intermediate layer units have been set, a coupling weight display picture as shown in FIG. 55 is displayed. Here, if an icon of "Start learning" (not shown) is selected, the learning of the neural network starts, and simultaneously the change of the connection weights are displayed in different colors corresponding to the magnitude of the connection weights.

As described above, in the first embodiment of the one-loop controller according to the present invention, it is possible to automate the operation which is controlled by operator's manual decision now, and thereby to contribute to laborsaving.

In the second embodiment of the one-loop controller according to the present invention, since an interactive type interface is provided to adjust the control parameters such as membership functions and the rules through the picture display interface, it is possible to reduce the labor related to the control parameter adjustment, so that the adjusting work of the actual system can be reduced.

In the third embodiment of the one-loop controller according to the present invention, since the interface pictures for executing the weight coefficient learning function are provided for the neural network, it is possible to reduce the labor required for the weight coefficient learning in the neural network, so that the adjusting work of the actual system can be reduced.

In the fourth embodiment of the one-loop controller according to the present invention, since the control parameters can be adjusted by the simulating function in the controller to some extent without operating the actual system, it is possible to reduce the load upon the controller adjusting work markedly.

In the fifth embodiment of the one-loop controller according to the present invention, since the image display apparatus is accommodated on the side surface of a rack and the display apparatus can be pulled out when necessary, it is possible to provide a large display picture easy to see without increasing the system space, so that the system manipulatability can be improved.

According to the image data display system according to the present invention, since a plurality of image data belonging to the same category can be displayed simultaneously so that the shapes thereof can be compared with each other, it is possible to classify the image data more effectively.

Further, in the connection weight input apparatus according to the present invention, since an object to be controlled is displayed on a monitor picture being divided into a plurality of areas and since an interface picture is provided so that the connection weights can be determined by designating a group of the divided area, it is possible to set the initial connection weights between the nodes of the neural networks more appropriately, thus improving the speed of the initial learning process. In addition, since the function for setting the number of image data pictures for initial value setting appropriately is provided, it is possible to construct a fail-safe recognition system.

What is claimed is:

1. A connection weight inputting apparatus, comprising:

means for inputting, to a neural network for recognizing an image pattern, connection weights from a plurality of nodes of an input layer of the neural network to a plurality of nodes of intermediate layers of the neural network;

means for displaying an image to be controlled on a display picture by dividing an image region into a plurality of regions according to the nodes of the input layer of the neural network;

means for selecting at least one of the nodes of the intermediate layers of the neural network;

means for determining the connection weights for the intermediate layers containing the selected nodes by selecting a divided area on the display picture to input the connection weights to the neural network.

* * * * *